United States Patent
O'Dell et al.

(10) Patent No.: US 10,742,577 B2
(45) Date of Patent: Aug. 11, 2020

(54) REAL-TIME SEARCH AND VALIDATION OF PHRASES USING LINGUISTIC PHRASE COMPONENTS

(71) Applicant: Disney Enterprises, Inc., Burbank, CA (US)

(72) Inventors: Sean O'Dell, West Hills, CA (US); Paul Pak, North Hollywood, CA (US); Drew Beechum, Pasadena, CA (US); Vita Markman, Los Angeles, CA (US); Marc Silbey, Mercer Island, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1164 days.

(21) Appl. No.: 14/059,306

(22) Filed: Oct. 21, 2013

(65) Prior Publication Data

US 2014/0280638 A1 Sep. 18, 2014

Related U.S. Application Data

(60) Provisional application No. 61/794,410, filed on Mar. 15, 2013.

(51) Int. Cl.
*G06F 17/00* (2019.01)
*H04L 12/58* (2006.01)

(52) U.S. Cl.
CPC .............. *H04L 51/12* (2013.01); *H04L 51/04* (2013.01)

(58) Field of Classification Search
USPC ....................................................... 704/7–10
See application file for complete search history.

(56) References Cited

U.S. PATENT DOCUMENTS

| 5,678,051 A | 10/1997 | Aoyama |
| 6,139,201 A | 10/2000 | Carbonell et al. |

(Continued)

FOREIGN PATENT DOCUMENTS

| WO | 02070088 A1 | 9/2002 |
| WO | 20041001558 A2 | 12/2003 |
| WO | 2008109680 A1 | 9/2008 |

OTHER PUBLICATIONS

Max Kaufmann: "Syntactic Normalization of Twitter Messages", The 8-th International Conference on Natural Language Processing, Jan. 1, 2010 (Jan. 1, 2010).

(Continued)

*Primary Examiner* — Leonard Saint Cyr
(74) *Attorney, Agent, or Firm* — Patterson + Sheridan, LLP

(57) ABSTRACT

A method and system is disclosed for evaluating a chat message sent between users of an online environment. The method may include receiving a chat message and parsing the message into words. The method determines the acceptability of the message by matching the message to a plurality of acceptable messages stored in a data structure. Upon determining the message does not match any acceptable messages, the method replaces each word in the message with grammatical metadata. The method may use templates to determine if the message has acceptable word combinations based on the metadata. The method may also compare the metadata to rules wherein the rules determine if the message has unacceptable word combinations based on the metadata. The method may send the message to a user upon determining words in the message do not match any word in a list of unacceptable words.

24 Claims, 11 Drawing Sheets

(56) References Cited

U.S. PATENT DOCUMENTS

| | | | |
|---|---|---|---|
| 7,027,974 | B1 | 4/2006 | Busch et al. |
| 8,015,051 | B2 | 9/2011 | Chen et al. |
| 8,606,726 | B2 | 12/2013 | Wurzer |
| 2001/0029455 | A1 | 10/2001 | Chin et al. |
| 2002/0049805 | A1 | 4/2002 | Yamada et al. |
| 2002/0059379 | A1 | 5/2002 | Harvey et al. |
| 2002/0062349 | A1 | 5/2002 | Maehiro et al. |
| 2002/0140726 | A1 | 10/2002 | Schwartz et al. |
| 2003/0097406 | A1 | 5/2003 | Stafford |
| 2003/0187632 | A1 | 10/2003 | Menich |
| 2004/0102957 | A1 | 5/2004 | Levin |
| 2004/0111479 | A1 | 6/2004 | Borden et al. |
| 2005/0038650 | A1 | 2/2005 | Bellegarda et al. |
| 2005/0076247 | A1 | 4/2005 | Wittkotter |
| 2005/0137851 | A1 | 6/2005 | Ryu et al. |
| 2005/0154580 | A1 | 7/2005 | Horowitz et al. |
| 2005/0203747 | A1 | 9/2005 | Lecoeuche |
| 2005/0240439 | A1 | 10/2005 | Covit et al. |
| 2005/0278413 | A1 | 12/2005 | Tannenbaum |
| 2005/0288931 | A1 | 12/2005 | Kaneko et al. |
| 2006/0003838 | A1 | 1/2006 | Kobayashi et al. |
| 2006/0090137 | A1* | 4/2006 | Cheng .................. G06F 3/0482 715/758 |
| 2006/0129633 | A1 | 6/2006 | Potluri et al. |
| 2007/0016401 | A1 | 1/2007 | Ehsani et al. |
| 2007/0118357 | A1 | 5/2007 | Kasravi et al. |
| 2007/0150426 | A1 | 6/2007 | Asher et al. |
| 2007/0168511 | A1 | 7/2007 | Brochu et al. |
| 2008/0071521 | A1 | 3/2008 | Larvet |
| 2008/0195571 | A1 | 8/2008 | Furuuchi et al. |
| 2008/0215519 | A1 | 9/2008 | Runge et al. |
| 2008/0221998 | A1 | 9/2008 | Mendelsohn et al. |
| 2008/0288241 | A1 | 11/2008 | Noda |
| 2009/0132528 | A1 | 5/2009 | Albornoz et al. |
| 2009/0210803 | A1 | 8/2009 | Brignull et al. |
| 2009/0245500 | A1 | 10/2009 | Wampler |
| 2009/0253513 | A1 | 10/2009 | Ducheneaut et al. |
| 2009/0271180 | A1 | 10/2009 | Balegar et al. |
| 2009/0299960 | A1 | 12/2009 | Lineberger |
| 2009/0319915 | A1 | 12/2009 | Bates et al. |
| 2010/0010800 | A1 | 1/2010 | Rehberg |
| 2010/0050074 | A1 | 2/2010 | Nachmani et al. |
| 2010/0057463 | A1 | 3/2010 | Weng et al. |
| 2010/0169769 | A1 | 7/2010 | Jimenez et al. |
| 2011/0092221 | A1 | 4/2011 | Zubas et al. |
| 2011/0154224 | A1 | 6/2011 | Bates et al. |
| 2011/0184718 | A1 | 7/2011 | Chen |
| 2011/0201387 | A1 | 8/2011 | Paek et al. |
| 2011/0202611 | A1* | 8/2011 | Malik .................. H04L 51/04 709/206 |
| 2011/0270771 | A1 | 11/2011 | Coursimault et al. |
| 2011/0270820 | A1 | 11/2011 | Agarwal et al. |
| 2012/0036147 | A1 | 2/2012 | Borst et al. |
| 2012/0041903 | A1* | 2/2012 | Beilby .................. G06N 3/004 706/11 |
| 2012/0054645 | A1 | 3/2012 | Hoomani et al. |
| 2012/0072404 | A1 | 3/2012 | Murphy et al. |
| 2012/0101970 | A1 | 4/2012 | Zernik et al. |
| 2012/0240062 | A1* | 9/2012 | Passmore .............. H04L 12/588 715/758 |
| 2012/0323565 | A1 | 12/2012 | Hildreth et al. |
| 2013/0046791 | A1 | 2/2013 | Markman et al. |
| 2013/0047099 | A1 | 2/2013 | Markman et al. |
| 2013/0091227 | A1* | 4/2013 | Bhakar .................. H04L 51/16 709/206 |
| 2014/0114895 | A1 | 4/2014 | Beechum et al. |

OTHER PUBLICATIONS

Ghayoomi Metal: "An overview on the existing language models for prediction systems as writing assistant tools", Systems, Man and Cybernetics, 2889. SMC 2889. IEEE International Conference on, IEEE, Piscataway, NJ, USA, Oct. 11, 2889 (2889-18-11), pp. 5883-5887.

Hunnicutt S Ed—Tubach J P et al: "Using Syntactic and Semantic Information in a Word Prediction Aid", Proceedings of the European Conference on Speech Communication and Technology (Eurospeech). Paris, Sep. 26-28, 1989; [Proceedings of the European Conference on Speech Communication and Technology (Eurospeech)], Edinburgh, CEP Consultants, GB, vol. 1, Sep. 26, 1989 (1989-89-26), pp. 191-193.

Park et al. "Communication Supports for Building World Wide Internet Game Communities". Entertainment Computing-ICEC 2006, pp. 370-373.

Boehret, Katherin; "The Mossberg Solution: Rating the New Instant-Messaging Programs"; Feb. 7, 2007; Wall Street Journal; Eastern edition; New York, N.Y. (0099-9660). P.D.1.

Mine et al. "Building a massively Multiplayer Game for the Million: Disney's Toontown Online". Computers in Entertainment (CIE) 1.1, Oct. 2003, pp. 1-20.

European Search Report for application No. 12180939.6; dated Oct. 2, 2013.

European Search Report for application No. 12180938.8; dated Oct. 2, 2013.

Method for Chat Spam Prevention in a Virtual World, Oct. 31, 2008, IP.com.

U.S. Appl. No. 13/873,455; entitled "Comprehensive Safety Schema for Ensuring Appropriateness of Language in Online Chat", filed Apr. 30, 2013.

European Search Report for Application No. 121180938.8 dated Jun. 7, 2016.

European Search Report for Application No. 12180939.6 dated Jun. 7, 2016.

* cited by examiner

REAL-TIME SEARCH AND VALIDATION OF PHRASES USING LINGUISTIC PHRASE COMPONENTS

CROSS-REFERENCE TO RELATED APPLICATION

This application claims benefit of U.S. Provisional Patent Application Ser. No. 61/794,410 filed Mar. 15, 2013, which is incorporated herein by reference in its entirety.

BACKGROUND

Field

Embodiments of the invention are generally directed to online communication. More specifically, embodiments of the invention are directed to a variety of techniques for managing the content of chat messages exchanged between users in online environments.

Description of the Related Art

Multiplayer video games and virtual worlds have rapidly become popular forms of online entertainment. Both generally provide users with access to a virtual environment where they may interact with one another. For example, avatars are frequently used to provide a graphical representation of each user present within a virtual environment and users interact with one another through their avatars. Users control the actions of their avatar to navigate the virtual environment, e.g., achieve gaming objectives as well as to communicate or chat with other users. Such an environment may be persistent where events occur and users interact with each other regardless of the presence of any particular user. Alternatively, such an environment may be game or session based, e.g., where a group of users participate in a match of a first-person shooter game.

Chatting is a prominent feature within these kinds of online environments. For example, a user may chat directly with other users present in the same virtual location by typing characters into a text-field on a user interface. To promote civility and safety among users, a service provider hosting an online environment may desire to prevent the use of obscene language or other inappropriate communication, particularly in online environments developed for minors. In such a case, chat software may filter chat messages by removing swear words, slurs, or other known terms of disparagement. Blacklist filtering does not detect semantically unsafe messages; it can only filter individual words. Because phrases going through a blacklist filter are allowed by default unless blocked by a specific word in the blacklist, this approach allows guests to say a nearly infinite number of phrases which, in turn, makes it vulnerable to guests saying unsafe words using alternate spellings (replacing "S" with "$" or "cks" with "x").

Whitelist filtering allows only safe words (or phrases), which prevents unsafe alternate spellings, but like blacklist filtering, does not detect semantically unsafe messages which can be formed using safe words. Further, whitelist filtering blocks at the word (or phrase) level, so words which are safe in some contexts but unsafe in others are blocked.

While such whitelist chat is safe, it is limited in the number of phrases it allows. Severely impacting user expressivity.

To protect a user's safety in online worlds, providers engage in continuous monitoring and filtering of chat. At a base level, providers filter out and prevent the sending of obvious profanity. The challenge is that people are very good at getting around the sort of filters which are typically used to detect and block unsafe messages. Every time a guests finds a way around one of the filter entries, a new entry must be made to block the unsafe phrases they are now saying. The system ends up flooded with filter entries put into place after-the-fact (meaning the damage is done by the time the filters are updated), often with entries which exist only because it was a work-around to another filter and which no one has tried to get around since it was first introduced. The race to detect and block unsafe message is a continuous, expensive process and in the end never provides a reliably safe environment for our guests. Additionally, the more complex a system becomes, the longer it takes for a phrase to be validated.

SUMMARY

A method and system is disclosed for evaluating a chat message sent between users of an online environment. The method may include receiving a chat message and parsing the message into words. The method determines the acceptability of the message by matching the message to a plurality of acceptable messages stored in a data structure. Upon determining the message does not match any acceptable messages, the method replaces each word in the message with grammatical metadata. The method may use templates to determine if the message has acceptable word combinations based on the metadata. The method may also compare the metadata to rules wherein the rules determine if the message has unacceptable word combinations based on the metadata. The method may send the message to a user upon determining words in the message do not match any word in a list of unacceptable words.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
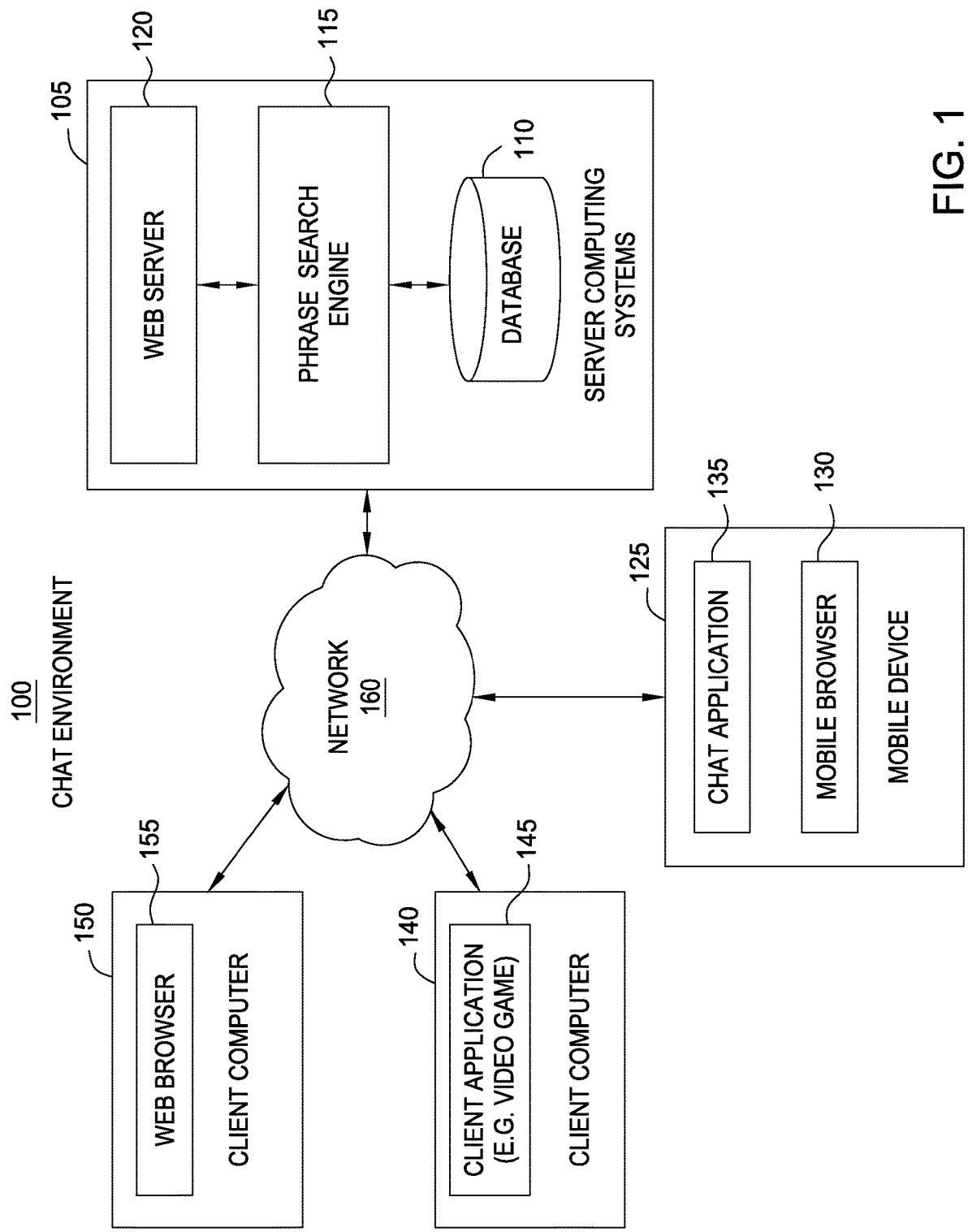
FIG. 1 illustrates a computing infrastructure configured to provide a safe and effective chat environment, according to one embodiment.

Embodiments of the invention provide techniques for supplying real-time search and validation of phrases using linguistic phrase components. In one embodiment, the users exchange message while participating in an online virtual environment. Alternatively, users may be exchanging messages in an asynchronous manner (e.g., as SMS messages sent between mobile telephones).

In one embodiment, a Phrase Search Engine provides a text matching system used to evaluate messages exchanged in for real-time online group and 1-on-1 chat, micro-blogging, text messaging, and other forms of text-based communication. The Phrase Search Engine helps maximize the number of phrases that users of an online community (typically minors) attempt to say to be permitted through chat message systems, but only if such messages are "safe," while unsafe phrases (profanity, bullying, etc.) are blocked and, when the situation warrants, reported. Note, as used herein "safe" chat refers to messages that are . . . Appropriate, and do not have secondary meanings.

The Phrase Search Engine helps to maximize expressivity of messages, while still blocking inappropriate messages by inverting the filter process such that instead of only blocking unsafe messages, generates a vast library of safe phrases (potentially numbering in the quintillions) matched against guest messages to the Phrase Search Engine. Doping so ensures that phrases permitted by the Phrase Search Engine contain only safe words, but that those words are combined in ways that are semantically safe as well.

To accomplish this, the Phrase Search Engine leverages a set of phrase resources. For example, such resources may include a corpus of a commonly used whole phrases (referred to as a "static corpus"), sets of commonly used words and rules (both inclusive and exclusive) which govern how those words can be combined (referred to as a "dynamic corpus") and a list of unsafe words against which are checked prior to posting (also known as the "bad word list"). In addition, auxiliary phrase components allow chat messages with common alternate spellings which are added to the system lexicon at run-time (known as "equivalences") and semantically harmless words in chat messages which may be added to any message ("optionals").

The Phrase Search Engine loads phrase resources into data structures, traversed them during the search process using methods which maximize the possibility of matching a chat message. The Phrase Search Engine can evaluate submissions while the guest is typing ("as-you-type search") and when they are finished and wish to "send" the message (typically through a chat system or persistent message store such as a blog).

Further, the Phrase Search Engine can generate suggestions for allowed phrases presented to a user during an "as-you-type-search." During as-you-type search, the engine resolves words in the partial message against phrases contained in the static corpus, allowing equivalences to match alternate spellings and optionals to appear in the message. The result is a list of suggestions which are returned to the calling client (typically a text box which displays suggestions as word bricks above the text box) which help the guest understand what is and is not allowed by the engine. If no match is found in the static corpus, the process of matching continues using the dynamic corpus, also allowing for equivalences and optionals.

Once a user submits a complete message, the text of the chat message is validated by the engine, except that the result back to the calling client is an identifier which may be delivered to other message systems. In turn, the other message system may redeem the identifier in exchange for a complete message which can be transmitted to other guests. If no match is found on submission, the message text is checked against the bad word list and if any words are found in the message, it is flagged as containing unsafe words and logged for later processing by downstream systems.

The Phrase Search Engine has many benefits over existing technology by taking a multifaceted approach to validating online chat. The Phrase Search Engine focuses on semantically safe phrases, so otherwise ordinary words such as "banana" which might be disallowed by white list filtering, is allowed by the Phrase Search Engine (but only in certain contexts, as described more fully below). The Phrase Search Engine allows an high number of phrases, comparable to the blacklist filtering, while providing a very high level of guest safety. The Phrase Search Engine allows phrases numbering in the quintillions, versus a couple hundred phrases supported by white list or menu chat.

Note, while discussed separately, the techniques for supplying users in an online environment with a safe and effective chat facility, one of ordinary skill in the art will recognize that the disclosed techniques may be combined, to operate in conjunction with one another as well as combined with other techniques for managing a chat facility provided to users of a virtual environment. Further, while some functionality is described as being provided by server components and some by client components, such distinctions are made to facilitate the following description. Further still, while virtual online environments are described as an environment where monitoring chat functionality may be useful, the approaches described herein may be adapted for use in variety of situations where individuals use software to send chat messages to one another. For example, in addition to a chat facility within a virtual world, embodiments may be used to manage chat messages exchanged between individuals sent as SMS messages on mobile telephones or messages sent using a variety of different software applications and/or chat protocols.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates an example computing environment, according to one embodiment. As shown, the chat environment 100 includes network 160 connecting a computing system server 105, a client computer 140 and 150, and a mobile device 125. The computing system server 105 has a web-server 120, a Phrase Search Engine 115 and a database 110. The client computer 150 has a web-browser 155, and the client computer 140 has a client application 145 such as a video game. The mobile device 125 has both a chat application 135 and a mobile browser 130.

The communication on the network 160 may be a wireless or wired protocol and the network 160 may be the Internet, a local area network, or wide area network. In one embodiment, the client computer 150 communicates over network 160 via a web browser 155 to a web server 120. The web server 120 provides access to safe chat sessions provided by the Phrase Search Engine 115. The Phrase Search Engine 115 utilizes a database 110 to store and retrieve information to determine the appropriateness of the chat.

In another embodiment, a client computer 140 uses a client application such to participate in a multiuser environment virtual environment. The Phrase Search Engine 115 provides real-time chat search and filtering services for the client application 145. In yet another embodiment, a mobile device 125 may use a chat application 135 or a mobile browser 130 to participate in a web server 120 chat session hosted on the computing system server 105. The web server 120 uses the Phrase Search Engine 115 to ensure the appropriateness of online chat. Alternatively, the client computer 140 may be a gaming console which plays the client application 145. The client application 145 may have chat capabilities and relies on the Phrase Search Engine 115 to provide real-time search and validation of chat phrases using linguistic phrase components for the purpose of identifying and filtering communication over a network 160. The chat environment 100 is included to be representative of a variety chat environments allowing users to communicate with one another.

Figure 2:
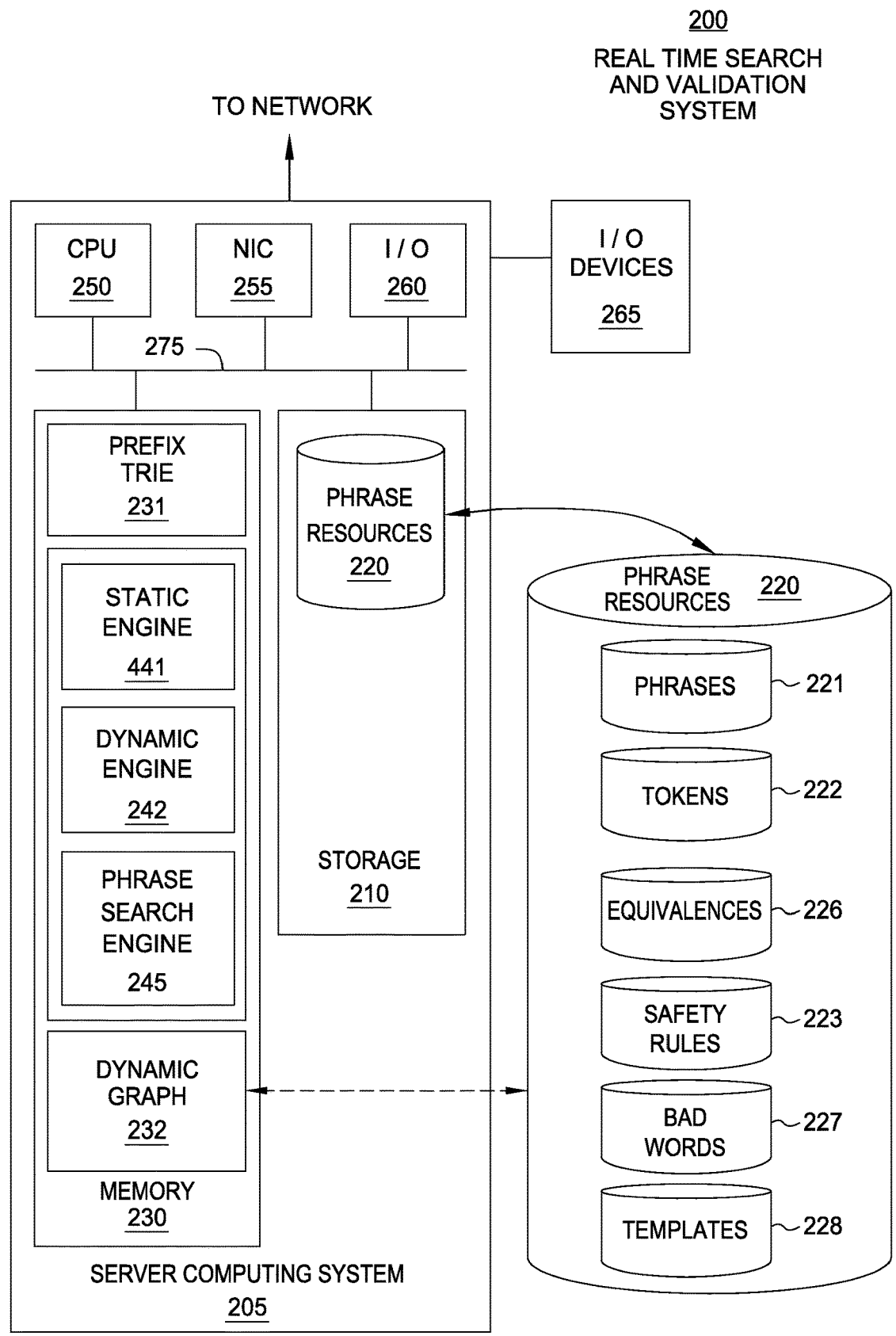
FIG. 2 illustrates an example real-time search and validation system, according to one embodiment.

FIG. 2 illustrates an example real-time search and validation system 200, according to certain embodiments of the present disclosure. As shown, the server computing system 205 includes a CPU (central processing unit) 250, a NIC (network interface card) 255, an input/output (I/O) card 260, memory 230, storage 210, connected by a bus 275. The server computing system 205 is connected to an input/output (I/O) device 265. The server computing system 205 is included to be representative of a variety of computing systems, including, e.g., tower server, rack mount server, a desktop computer, a laptop computer, or other computing devices capable of providing chat services to other devices.

The chat services may be viewed on the display device 370, e.g., monitor display and controlled using input devices 365, e.g., a keyboard, mouse. CPU 250 is a programmable logic device that execute instructions, logic and mathematical processing, and may be representative of one or more CPUs or GPUs, multi-core CPUs or GPUs, and the like. The memory 230 represents any memory sufficiently large enough to hold a prefix trie 231, dynamic graph 232, and a Phrase Search Engine 240. The Phrase Search Engine 240 includes both a static engine 241 and a dynamic engine 242. The static engine 241 is discussed in more detail relative to a description of FIG. 9. The dynamic engine 242 is discussed in more detail relative to a description of FIG. 10. Memory 230 could be one or a combination of memory devices, including Random Access Memory (e.g., DRAM modules).

Storage 210 stores application programs and the phrase resources 220 for use by the Phrase Search Engine 240. Storage 210 is included to be representative of hard-disk drives, solid-state drives (SSD), flash memory devices, optical media (e.g., CD/DVD/Blu-Ray® discs) and the like. The storage device may be internal to the server computing device 205 or external such as a NAS, SAN, cloud or other storage environment. The phrase resources 220 have a number of smaller databases which support the applications in memory 230. The phrase resources 220 may contain phrases 221, tokens 222, equivalences 226, safety rules 223, bad words 227 and template bitmaps 228. The phrase resources 220 may be part of the database 110 as shown in FIG. 1.

In one embodiment, a user is participating in a multiuser virtual environment application. A user begins a chat session by typing into the chat interface. The chat sessions are searched and validated by the Phrase Search Engine 240.

The static engine 241 evaluates a chat massage as it is being typed. Additionally, the static engine checks the eventual validity of the complete message, as well as identifying suggestions for completing the last term in an otherwise allowable phrase. The static engine 241 traverses the nodes of a prefix trie 231 with the words comprising a message while it is being composed to validate the message as each word is added and to suggest a next word for the message. The user may accept one of the suggested next words and the engine traverses to that node of the prefix trie 231. Alternately, the user may type one of the many not suggested nodes. This continues until a chat phrase is complete and ready for posting. If the complete chat message is a traversable path in the prefix trie, then the static engine validates the complete phrase, allowing it to be sent to a recipient. Alternatively, if the phrase is determined to not be in available in the prefix trie, the static engine 241, pass the phrase on to the dynamic engine 242 for validation.

The dynamic engine 242 uses the phrases resources loaded into the resource memory 232. Loading the resources into memory provides improved performance and assists in real-time assessment of chat. The phrase resources include annotation templates 228 and rules for use by the dynamic and static engine. The first seven words in a phrase are used in the templates 228. A template bitmap is an array created in memory to hold all the templates 228. A template bitmap is generated for each word in a phrase. The template bitmaps are joined using a "logical AND" (&&) to determine a set of templates 228 which allow a given phrase. The phrase is checked against the applicable safety rules 223 and the words in a phrase are checked against the bad words 227. For a phrase to be sent it must satisfy the check by the static engine or the check by the dynamic engine.

Figure 3:
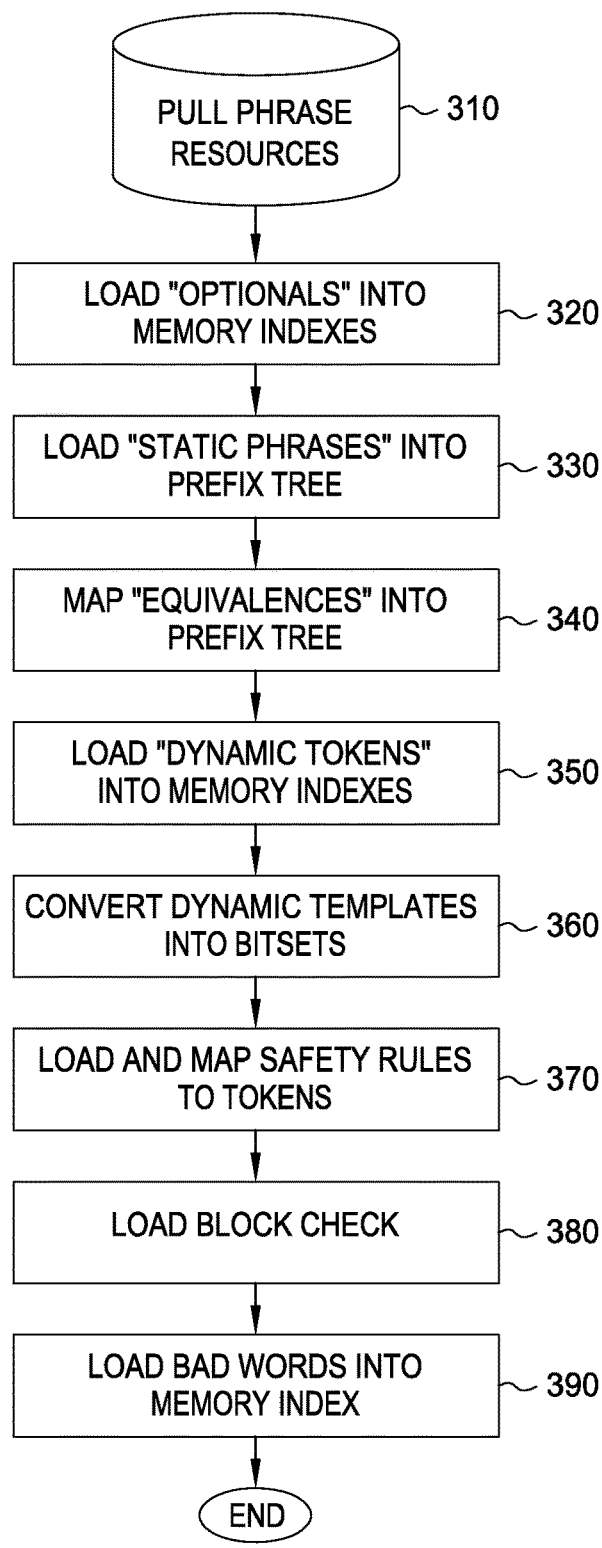
FIG. 3 illustrates a method flow diagram for loading the phrase resource into memory for use by the Phrase Search Engine, according to one embodiment.

FIG. 3 illustrates a method flow diagram 300 for loading phrase resources into memory, according to one embodiment. The phrase resource corpus is the original set of data in a form suitable for the development of resources used by the Phrase Search Engine. It is not used directly for search; instead, resources built from the phrase resource corpus are loaded into memory to provide validation of chat messages in near real time. That is, chat messages are validated when composed by users without an unacceptable delay in either generating next-word suggestions (via traversing the prefix trie using the static engine) or validating a complete chat message (via the static, dynamic, or other engines) prior to being sent to a recipient In step 310, the phrase resources are pulled from a database and loaded into memory. In one embodiment, the resources are loaded into memory and indexed.

Optionals are those elements inserted into written text which are allowed but do not contribute to the analysis of a phrase. Optionals are semantically meaningless words considered safe enough to allow at the start or end of any phrase. For instance, a emoticon (i.e. ☺ and LOL) may be examples of optionals. The ability to allow or not allow the use of optionals is configurable. In step 320, optionals are loaded into memory. The Phrase Search Engine accesses the database to index the options in memory.

In step 330, static phrases are loaded into a prefix trie. The static phrases are those phrases already approved already approved and stored in the phrase resources. The prefix trie allows fast lookups across a 2-dimensional array where the data is typically duplicated on one end of the second dimension and becomes more unique towards the other end; this is typical of chat messages ("I like that car", "I like that hat", "I like to dance") and words ("head", "header", "heater"). Starting from a root node, each word in loaded into a node of the prefix tree with subsequent words populating child nodes in the tree. Phrases with the same beginning words will share nodes until the words are no longer the same. At this juncture, the two different words will share the same parent node but occupy different child nodes of that parent.

In one embodiment, a prefix trie is generated in memory by loading a database of approved phrases. In another embodiment, a copy of the prefix trie is pulled from storage and loaded into memory.

Equivalences are those words or terms used to represent other words in a phrase. For instance, "ur" may be an equivalence for normal speech "you are". In step 340, equivalences are made part of the prefix trie by locating the "normal" parts of speech associated with the equivalence, and adding nodes to the trie in virtually the same way as during the Phrase load process. However, unlike adding nodes to a prefix tree from a collection of allowed phrases, an equivalence mapping may be acyclic; that is, their ends can point right back into the tree. Given the previous tree as a starting point, with the equivalence "ur"->"you are" loaded.

Tokens are typically words (though a token may consist of several words") and are annotated for both semantics (used by templates) and safety (used by safety rules). For example: blue (semantics: adj_mood, adj_color, n_petname; safety: adj_depression, adj_risque). Note that blue can be an adjective for mood, color, a pet name, a safety word related to depression or risque. In step 350, dynamic tokens are loaded into the memory indexes. The Phrase Search Engine accesses the database of phrase resources to place the tokens into memory.

In step 360, dynamic templates are converted into bit maps. The templates provide acceptable word combinations. A template captures the structure for (at most) the first seven words of a phrase. After seven words, the intentions of the phrase can be fairly well determined. A token (representing a word, or in some cases short phrase) may occupy any one of seven positions in a template. For instance, in the phrase "I run fast" the word "I" would occupy the first position in the sentence and in a templates, the word "run" occupies the second position. Templates are loaded as an array of bitmaps associated with each token. Each array is the length of the maximum configured phrase length. Therefore, each token typically has 7 bitmaps. Each bitmap contains the exact number of bits for which there are templates. There are approximately 80,000 templates per language, so each token will typically need to store around 7*80,000 bits (~68 MB per token).

Each template bitmap registers a 1 or 0 to indicate whether a word in a particular position in a phrase satisfies a template. For example, looking again at the phrase, "I run fast", the phrase grammatically breaks down to (pronoun, v_action, adverb). A template [n_poss, v_action, adj_color, noun], the first word does not fit into the template and therefore sets the bit to 0 for this template in its template bitmap. The second word does fit the template and therefore sets a bit to 1 in its template bitmap for words in the second position. The third word would sets the bit to 0 for the corresponding template in the third word template bitmap. Therefore, an analysis of a bitmap reveals which templates will allow a given word in a given position. This is repeated for each word in a phrase. In one embodiment, a particular word in the first position of a phrase satisfies seven templates and therefore has a bitmap with seven bits set to 1.

In step 370 the safety rules are loaded into memory and mapped to tokens. The Phrase Search Engine accesses the database of phrase resources to index the safety rules in memory. In one embodiment, the rules contain an array of token sets which are used to match against tokens found during the dynamic search. The safety rules block inappropriate metaphors; a phonetic-based component for blocking combinations of good words that are used to spell, or otherwise infer, bad words; and a trending component for discovering new or new uses of words. The rules allow exceptions when processing a phrase and those exceptions are recorded with the rule. The rules rely on annotation associated with token to operate. For instance, "banana" is a noun food but also has sexually connotations when used in certain ways with other words. The safety rules provide a schema which promotes expressivity.

In step 380 blocks checks are loaded into memory. The block check is also a prefix trie search like ones used in the static search. However the behavior is a little different. The block check identifies an "exact-match" using specific matching rules to allow for case and accents/diacritics. A block is a prohibited group of phrase elements. For instance, assume the two-word combination "turn trick" would be unacceptable anywhere in a phrase. However "turn" and "trick" by themselves are relatively benign. A block of these two words prevents them from being used together. That is, a block consists of a sequence of words loaded into a prefix trie for search and validation of a phrase. The block check trie is used to match words or combinations thereof in the chat message being evaluated.

Words identified as "bad" are prohibited from use in chat messages, regardless of context. In step 390, an index of bad words is loaded into memory. The Phrase Search Engine is ready to real-time search and validate phrases using linguistic phrase components after loading the phrase resource database into memory.

Figure 4:
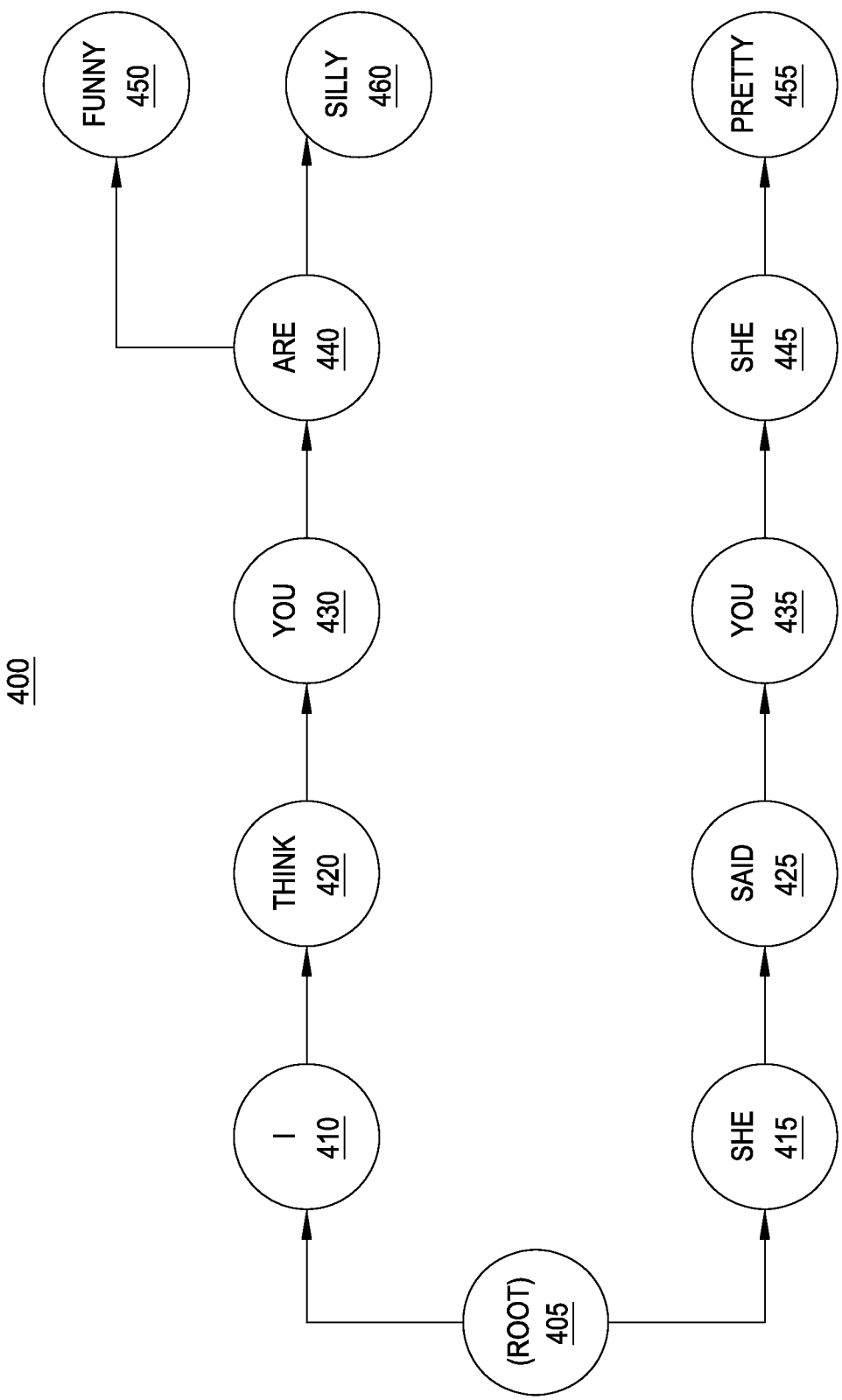
FIG. 4 illustrates an example of prefix trie used for real-time search and validation, according to one embodiment.

FIG. 4 illustrates an example of prefix trie 400 used for real-time search and validation, according to an embodiment of the invention. A prefix trie 400 is an ordered tree data structure that is used to store a dynamic set or associative data. The position in the tree defines the key with which it is associated. Child nodes 471 and 472 of a parent node 470 have a common prefix of the string associated with that node. In the present context, the root of the prefix trie 400 is associated with an empty string. In this example, the child node 471 has a value of "funny" 450. And the parent node 470 of the child node 471 share an associated string—"I think you".

Given the following phrases, this is how the prefix trie 400 would be loaded: "I think you are funny", "I think you are silly" and "she said you are pretty". First, the prefix trie 400 has a root node 405 and one set of leaf nodes with values of "I" 410, "think" 420, "you" 430, "are" 440, "funny" 450 and "silly" 472. Along different set of leaf nodes, the root node 405 has leaf nodes "she" 415, "said" 425, "you" 435, "are" 445, and "pretty" 455. To populate the prefix trie 400, the Phrase Search Engine starts at the root node and identifies a match of the first word and if none exist, starts a new leaf node. For example, if the Phrase Search Engine is loading phrases and has already loaded the phrase "I think you are funny" and then reads the phrase "I think you are silly", the Phrase Search Engine traverses the nodes "I" 410, "think" 420, "you" 430, "are" 440, until not finding "silly". The Phrase Search Engine then creates a new child node 472 for parent node 470 and assigns the child node 472 value of "silly" 472.

Searching the prefix trie 400 to match a partial (or complete) chat message is performed in a similar fashion. The Phrase Search Engine starts at the root node 405 looking for a node with an equivalent value to the phrase. For example, if the Phrase Search Engine was given the phrase "she said you are pretty" to validate, the Phrase Search Engine would start of at the root node 405 looking for the first word in the phrase "she". The Phrase Search Engine would find a match to "she" in node 415. For node 415 the Phrase Search Engine would look for, and find, a child node 425 with the value "said". This continues for the values "you" in node 435, "are" in node 445, and "pretty" in node 455. As the last node 455 exactly matches the last word in the phase "pretty", the phrase is determines to be valid/pre-approved.

Additionally, an acceptable phrase may contain several acceptable phrases as well. For instance an acceptable phrase "lets meet up later" also has an acceptable phrase "lets meet up". However the phrase "lets meet" might not be acceptable. All three phrases are present in the prefix tree. The latter two are sub-phrases or the larger phrase, "lets meet up later". Therefore both the node containing the value "up" and the node containing the value "later" indicate a last word. When the Phrase Search Engine traverses the trie, a last word can thus be determined. Ending a phrase requires ending the prefix trie traversal on a node marked as a last word.

Figure 5:
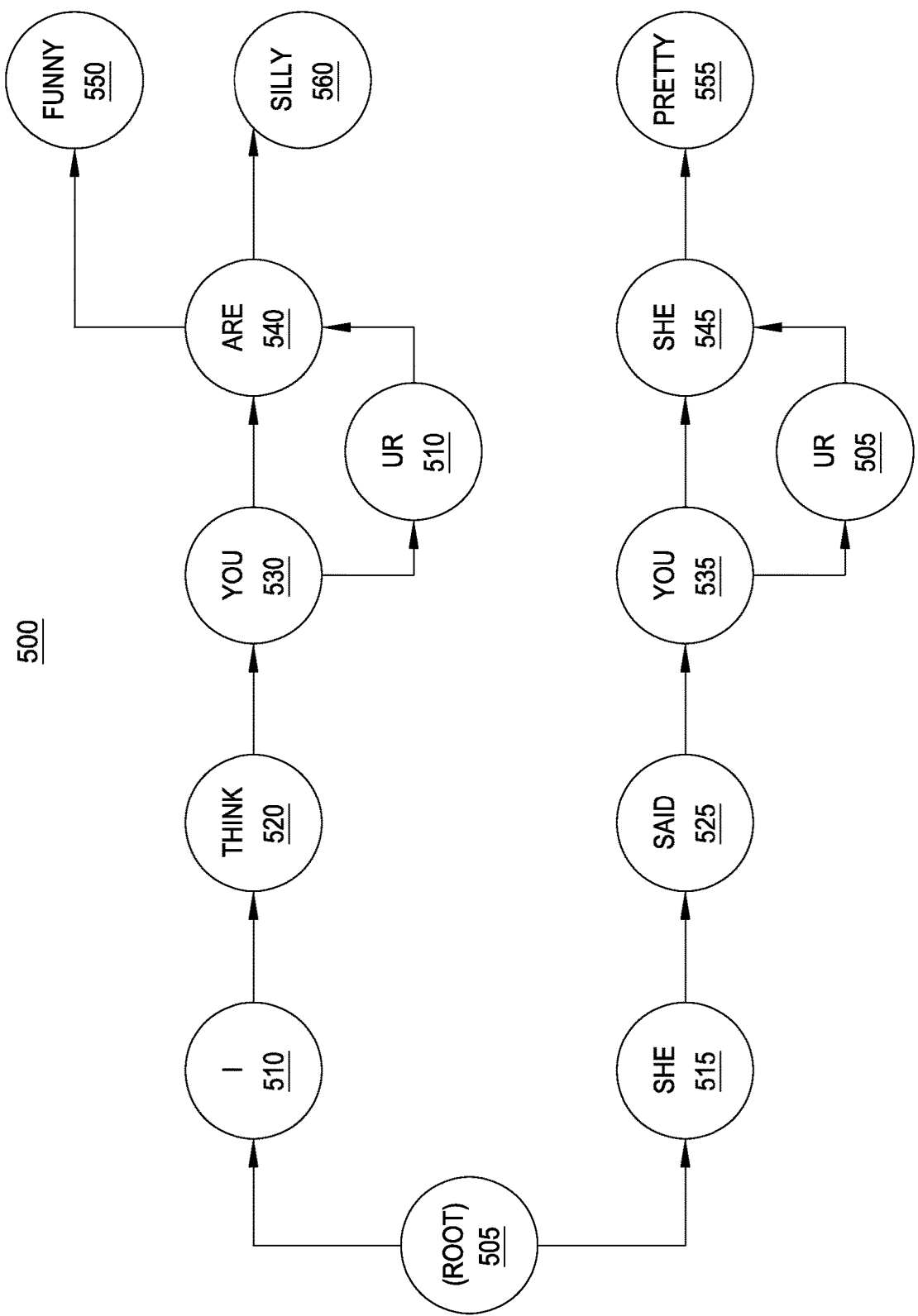
FIG. 5 illustrates an example of equivalences loaded into a prefix trie, according to one embodiment.

FIG. 5 illustrates an example of equivalences loaded into a prefix trie, according to certain embodiments of the present disclosure. A shown in FIG. 5, equivalences node 505 and node 510 are added to the prefix tree 400 (of FIG. 4), resulting in prefix trie 500. An equivalence generally refers to one or more words which are not considered "normal speech" but are safe and can be equated with elements of normal speech. For example: "ru" may provide a valid equivalence for the phrase "are you" or for the word "Russia". In one embodiment, the Phrase Search Engine searches the prefix tree for parent and child nodes, which when combined, have equivalences. The Phrase Search Engine creates node paths with the equivalences that allow the phrase to continue in the prefix trie 500.

Traversing prefix trie 400 with the phrase "I think ur funny" would fail validation. However "ru" has acceptable equivalences in prefix trie 500. Therefore, when traversing the prefix trie 500, the phrase "I think ur funny" validate.

Figure 6:
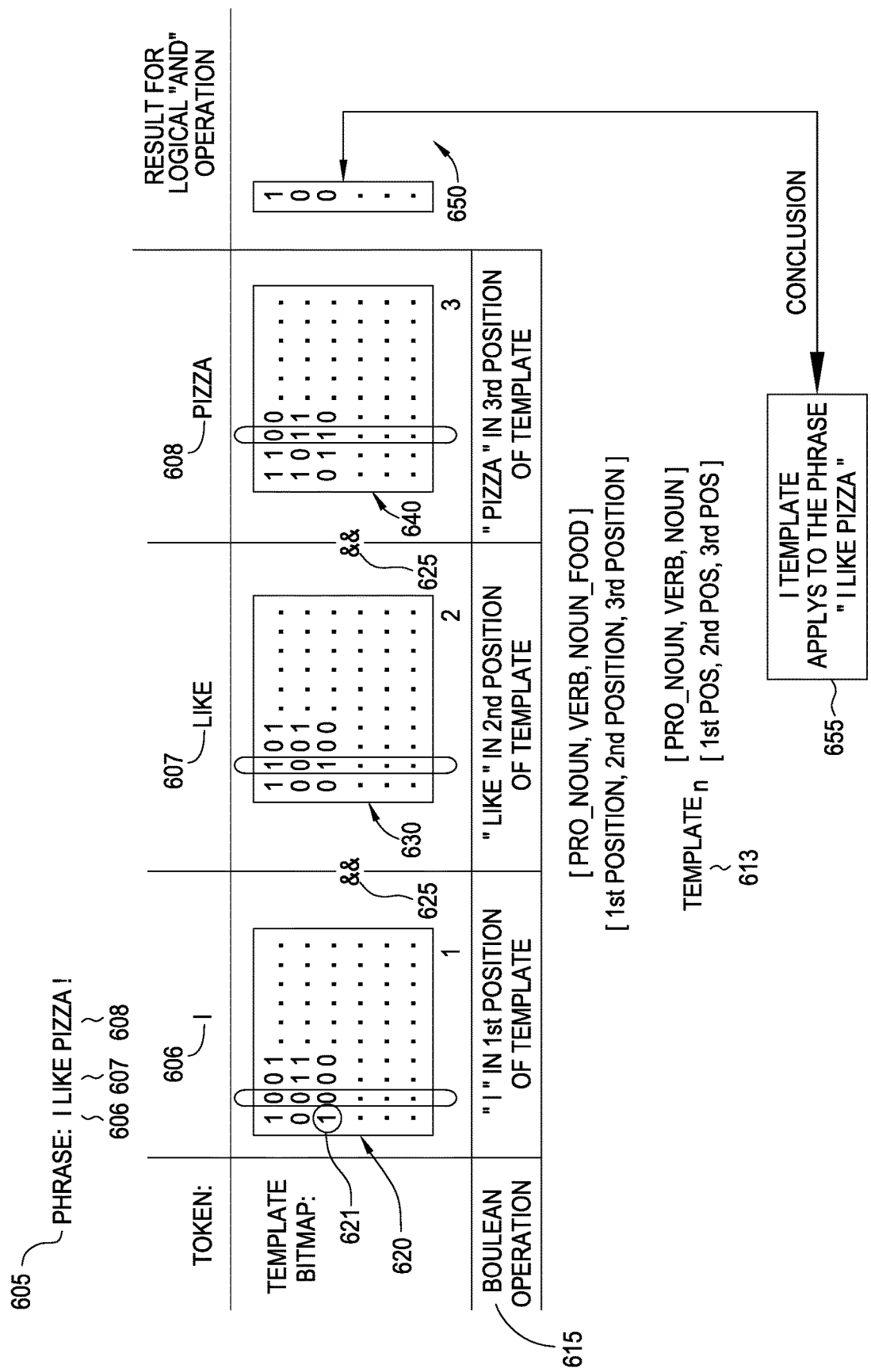
FIG. 6 illustrates an example of a logical AND (&&) performed on bit templates for the words in a phrase, according to one embodiment.

FIG. 6 illustrates an example 600 of a logical AND performed on bit templates for the words in a phrase, according to certain embodiments of the present disclosure. A sample template bitmap 610 is comprised of templates 611, two of which are template$_1$ 612 and template$_n$ 613. A phrase 605, to be used in the example 600, is composed of the word "I" 606 associated with template bitmap 620, "like" 607 associated with template bitmap 630, and "pizza" 608 associated with template bitmap 640. The bitmap templates have a Boolean operation 615 for determining whether a bit 621 is on (1) or off (0). The template bitmaps 620, 630 and 640, associated with the phrase 605, are combined using a logical and (&&) 625 to obtain a results template bitmap 650. The results template bitmap 650 provides the Phrase Search Engine a conclusion 655 for which templates to apply to the phrase 605.

For example 600, a phrase 605 is parsed into the reveal the word "I" 606 in a first position, the word "like" 607 in a second position, and the word "pizza" 608 in a third position. A first template bitmap is pulled for the "I" 606 from an array of template bitmaps for the word. For instance, "I" 606 may have an array A 620 where A:[0:[0 . . . 79,999], 1:[0 . . . 79,999], 2:, 3:, 4:, 5:, 6:];
"like" 607 may an array B 630 where
B:[0:[0 . . . 79,999], 1:[0 . . . 79,999], 2:, 3:, 4:, 5:, 6:]; and
"Pizza" 608 may an array C 640 where
C:[0:[0 . . . 79,999], 1:[0 . . . 79,999], 2:, 3:, 4:, 5:, 6:].
Therefore a template bitmap 620 corresponding to "I" 606 in a first position, (A[0:[0 . . . 79,999]) 620, a template bitmap 630 corresponding to "like" 607 in a the second position (B[1:[0 . . . 79,999]) 630, and a template bitmap 640 corresponding to "pizza" 608 in a third position (C[2:[0 . . . 79,999]) 630 are all used for phrase 605 in the logical and (&&) 625 operation to determine a results template bitmap 650.

The results template bitmap 650 indicates to the Phrase Search Engine that there one template which may be used for phrase 605. As shown, the results from the && 625 operation provides a results template bitmap 650 with 1 bit turned on. This bit corresponds to the template$_n$ 613. That is, for this example 600, there are only one template of the 80,000 templates, for which contain the word combinations of the phrase 605. In some embodiments there may be no templates from the results template bitmap 650. In other embodiments there may be numerous available templates. Results are dependent on the words and their position they have in a phrase.

The annotations themselves are lost in the process. A word in position one will have a bit array exactly as long as the number of templates(7). If a word is annotated as a noun AND a verb, and there are 8 templates using the noun annotation in position one and 5 other templates using the verb in position one, there will still be the same number of bits in the array for position one (total number of templates) but for that one word, the bit array for position one will have 13 bits flipped on.

Determining which may be applied to a given using bitwise operations is computationally very fast. Additionally as new words, tokens and templates become available; bitmaps can be easily re-generated to include those templates in the search.

Figure 7:
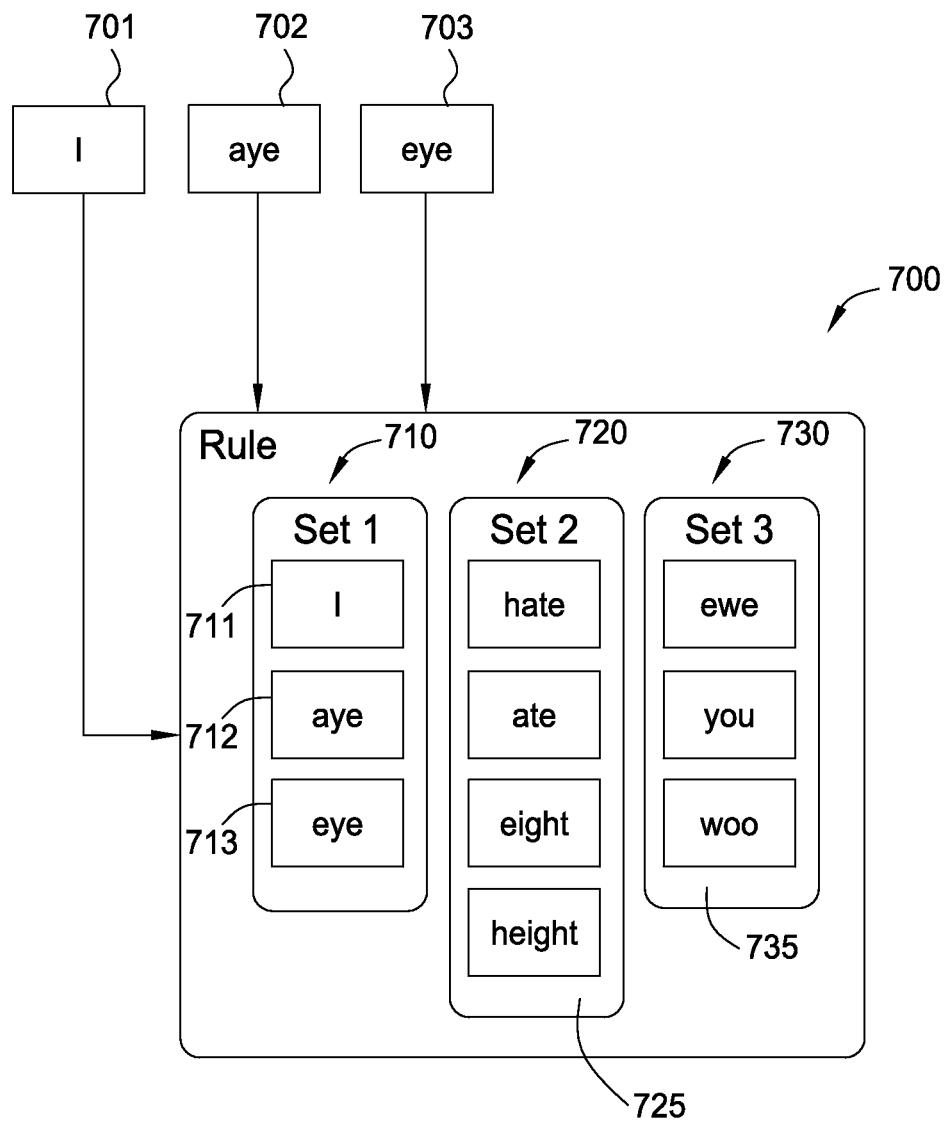
FIG. 7 illustrates an example of a safety rule, according to one embodiment.

FIG. 7 illustrates an example of a safety rule 700, according to one embodiment. Safety rule 700 includes category set 1 710, category set 2 720, and category set 3 730, Category set 1 710 contains three tokens, "I" 711, "aye" 712, and "eye" 713. Category set 2 720 contains tokens 725 and category set 3 730 contains tokens 735. A phrase including one of these tokens, i.e. either tokens "I" 701, "aye" 702 or "eye" 703, triggers a search in safety rule 700. In this example, literal sets of tokens are used for each category. Also note a category is a group of words sharing the same semantic meaning for purposes of a given safety rule. For example, the literal tokens "I" "aye" and "eye" all provide the same phonetic content. Then note, other rules may list categories, which may resolve to individual tokens. At this point the "category" sets can be viewed as "literal" sets. Since literal sets are already a complete set of tokens (array), the category rules are indistinguishable from literal rules and are processed in the same manner.

The tokens in set 1 710 are given a reference to the rule. Each token lists of one or more rules that might apply as the starting token for a rule. For instance, each token, "I" 701, "aye" 702 or "eye" 703, is in the set 1 710 and triggers a search through the remaining sets in the rule. This helps make the safety rule test process more efficient by avoiding the need for a secondary lookup to locate rules which might apply to a token, and avoiding the need for comparisons in the first set. Safety rules are always applied to a successful dynamic match. The tokens are associated with safety rules. Therefore, a safety rule is matched on the first token and testing within the safety rule begins with the second token.

However exceptions are provided when checking a phrase against an applicable safety rule. For example, a buffer distance may specify a number of tokens allowed between the category or literal sets. For instance, a buffer distance of "0" requires the existence of the two tokens to be in order with no other intervening tokens. A buffer distance of one allows for one interviewing token between matching tokens in two successive sets in the safety rule. For instance, the phrase "aye 2 ate ewe" would not be blocked by safety rule 700 because "aya" 702 is in set 1 710 but "2" is not present in set 2 720. However, if rule has a buffer distance of 1 of a token one position away from "aye" 702" is the token "ate" which is present in set 2 720. Additionally, the next token "ewe" is present in set 3 730. Therefore with a buffer distance of 1, the phrase "aye 2 ate ewe" satisfies safety rule 700, resulting in the chat message being blocked from being sent to a recipient.

A "breaker category" is a word, or group of words, that when encountered in a chat message being evaluated using a safety rule, prevents the safety rule from being applied, even though tokens may occur within the buffer distance that would otherwise satisfy the safety rule. More generally, a breaker category provides words that create an exception to the application of the safety rule. As noted above, the safety rules are applied to chat messages that otherwise match a dynamic template, indicating an allowed chat message. The safety rules are evaluated to weed out specific phrases having objectionable phonetic or secondary semantic meaning. Against this, the breaker category defines exceptions that would otherwise be blocked by a safety rule. An example of a breaker category may be a conjunction, such as "and". A phrase "I ate and you" may be submitted. Assuming a buffer distance of 1 safety rule 700 would be triggered. However, a breaker category including conjunctions, e.g., of "and", the token "ate" is found in set 2 720, but before a token can be checked in set 3 730, the breaker category "and" stops the rule check Safety categories beginning with the first set 1 710. However, a trigger for a safety category may occur for any token in a phrase. For instance, the phase "oh my, I hate you dummy" may pass safety rule check for the first token "oh" in set 1 where "may" is not in a set 2 of some safety rule associated with "oh". The second token "my" in set 1 of a safety rule associated with "my" may also not have "I" in a set 2 of the rule. However the third token "I" associates with safety rule 700 (because the token for "I" is in the first safety category). Checking this phrase forward from this point, "I" is now treated as the first token in set 1 710 and "hate" is checked for inclusion in set 2 720. Upon checking "you" inclusion in set 3 730, the phrase "oh my, I hate you dummy" satisfies the safety rule 700 and therefore is blocked.

The safety rules include literal safety rules and category rules. For example rules that block "nah ik it" and bad idioms like "birthday suit" and things like "sex_noun, sex_verb" are examples of safety rules. However, the first two="nah ik it" and "birthday suit" may be referred to as literal safety rules, while the latter like "sex_noun,sex_verb" may be referred to as a category rule. The literal rules and the category rules are applied in the manner demonstrated in FIG. 7.

Figure 8:
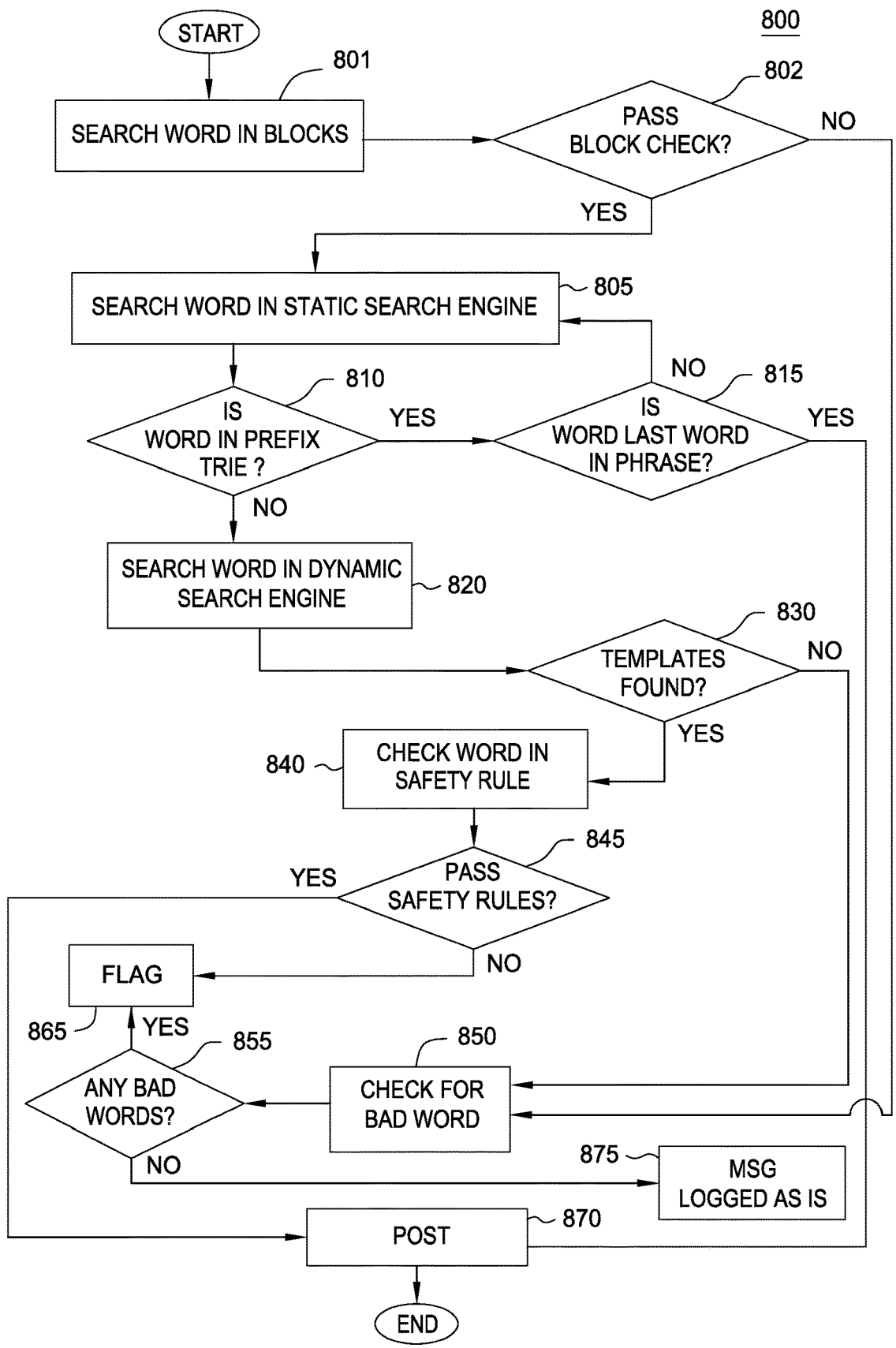
FIG. 8 illustrates a method showing an overview of the Phrase Search Engine process, according to one embodiment.

FIG. 8 illustrates a method 800 showing an overview of a Phrase Search Engine process for evaluating a chat message prior to being sent to a recipient, according to one embodiment of the invention. More specifically, method illustrates a process for determining whether a phrase (or partial phrase) is considered acceptable.

In step 801, each word in the search phrase is checked to determining whether if it begins a "block" Within a prefix trie. The search is performed in the block check trie similar to the prefix trie. However, in a block check, each word in a phrase is searched as a beginning node to a block. A match on a word causes a traversal for the original search phrase instead of tokens. That is, the block check looks for an "exact match" for phrase content. For example, a single block "private places" prevents any phrase containing these specific words in the specified sequence. For example, if a user enters, as a chat message, the phase "I saw his private places." The block check starts with "I" but does not find a child node "saw". The block check searches the next word "saw" for a root and in this particular example does not find a root node. This continues until the root node "private" in the block check trie is identified. Checking the next word for a child node leads to the block "private places" (because like the static trie, "private" is a root node, and "places" is a child of "private"). At this point, given that the candidate message includes the complete block "private places" the phrase is blocked.

In step 802, the flow for a phrase through the engine is based on whether the phrase was capable of passing the block check. Phrases which do not pass the "block check" are sent to be checked or bad words. A phrase which passes the "block check" is searched in the static search engine for acceptable phrases.

In step 805, the Phrase Search Engine receives a phrase which passed the block check and begins a word search. The static engine does not block unsafe messages, but instead provides a vast library of known safe phrases (potentially numbering in the quintillions) which are matched against guest messages submitted for filtering using the Phrase Search Engine. To accomplish this, the Phrase Search Engine leverages the phrase resources which make up a list of commonly used whole phrases stored in the prefix tries (Discussed in FIGS. 3, 4 and 5). The Phrase Search Engine has auxiliary phrase components which allow common alternate spellings and words. The alternate spellings (known as "equivalences") and the semantically harmless words ("optionals") are loaded into the system memory. During as-you-type search, the engine traverses the prefix tries using each word of the phrase, allowing the equivalences to match alternate spellings and the optionals to appear in the message.

In step 810, each word of the phrase is checked in the prefix trie. If the word is found in the value of a child node, in step 815, the static engine checks if the child node is the end of a branch or if the child node is also a parent node to at least one other child node. If the last node was an end node and an additional word is added to traverse the prefix trie, then the phrase is not in the prefix trie and in step 820 a dynamic validation of the phrase begins. However, if the last word matches the value of the last node traversed, then upon submitting the phrase for posting by a user, in step 870 the phrase is traversed through the prefix trie again for validation prior to posting.

Should the value for a word not exist at a child node, then at step 820, the dynamic search engine validates the phrase. In this step, as described in greater detail below relative to FIG. 10, the dynamic search engine evaluates the phrase against templates to determine whether the complete phrase can be matched to at least one template, based on annotations for each word. Additionally the phrases are checked for unsafe nefarious language as well as trends which may indicate new words or uses for otherwise safe words.

The templates and schemas for the dynamic search engine rely on a complete or at least 7 word, phrases. A phrase may have passed from the static engine to the dynamic engine while a user types and the dynamic engine checks a complete phrase, or at least the first 7 words, Step 820 ensures enough of the phrase is present to be properly vetted by the dynamic search engine.

In step 830, templates are located for a given phrase. The suitable templates are found by operation of a logical AND (&&) on the template bitmaps. Determining suitable templates for a phrase using bitmaps and a logical AND operation was discussed in FIG. 6. If suitable templates are not found, then the combination of words in the phrase is considered suspect. However, this does not mean the phrase is entirely unsafe.

In step 850, the phrase is checked for "bad words". These are phrases which failed the block check or did not have a suitable template. A match for a word in the message to a word in the "bad word" corpus indicates a "bad word" exists in that message. In step 855, a match found between the "bad word" corpus and a word in the message results in the message being unacceptable. A message determined to be unacceptable is flagged in step 865. Step 875 logs message determined to not have any bad words and those messages which also have word combinations for which templates were unavailable. That is, the system adds log entries to record messages users attempt to send that do not contain words on the "bad words" list but also cannot be validated using the static engine (and the prefix trie) or the dynamic engine (matching one or more templates).

Returning to step 830, where a template for validating word combinations in the message is found, in step 840, safety rules are applied to the phrase to look for other hidden messages therein. The application of the safety rules was discussed in FIG. 7. The application of the safety rules may occur for literal tokens or using categories. The words are annotated to evaluate the phrase with a set of safety rules. For example "pizza" and "donut" may be annotated with "noun_food" while "eat", "eating", "munch" and other consumption and cooking verbs are annotated as "verb_eat". The phrase template such as "verb_eat, noun_food" permitted the phrase like "eats pizza" and now the phrase "eats pizza" is checked against the safety rules. The safety rules provide how certain words assigned to categories may be combined so as to capture meaning (possibly hidden) of a message. Looking back at FIG. 7, we would find safety rules associated with the word "eats" or the "werb_eat". Looking at the next set (set 2) a quick search for "pizza" or "noun_food", or lack thereof, would indicate there may be no hidden meaning to the phrase. In step 845, the message containing unacceptable material, i.e. failed the safety check, is flagged in step 865. However, a determination that the message is safe, such as "eats pizza", directs the message to step 870.

In step 870, a message is prepared for posting. On submission (sending the message), the text is validated in a similar way by the engine, except that the result back to the calling client is an identifier (an "id") which may be delivered to other message systems which, in turn, may redeem the id in exchange for a complete, entirely safe message which can be transmitted to other guests. If no match is found on submission, the message text is checked against the bad word list and if any words are found in the message, it is flagged as containing unsafe words and logged for later processing by downstream systems.

Figure 9:
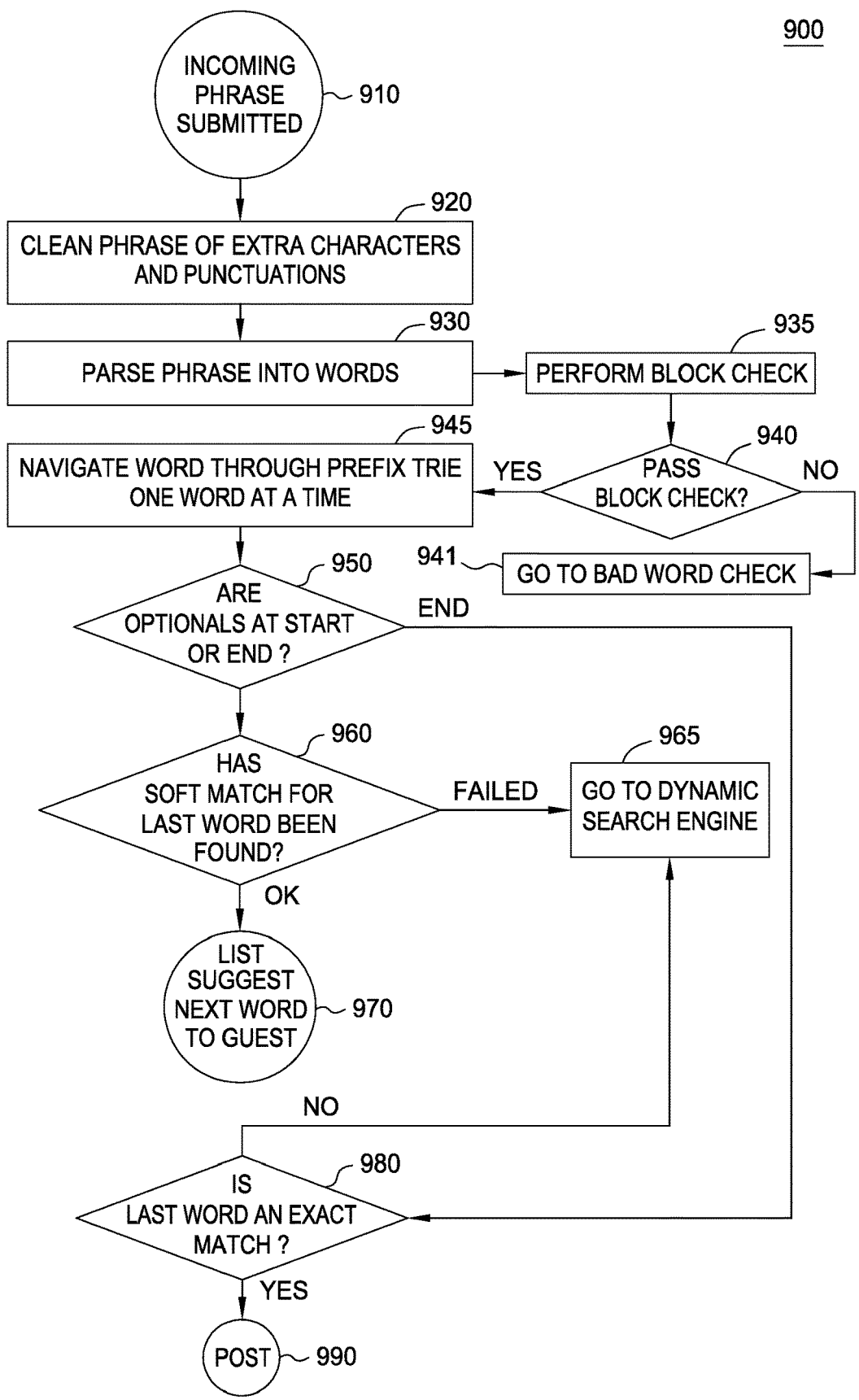
FIG. 9 illustrates a method for the static engine in the Phrase Search Engine, according to one embodiment.

FIG. 9 illustrates a method flow diagram for the static engine in the Phrase Search Engine, according to one embodiment of the invention. After the phrase resources are loaded and indexed into memory, the Phrase Search Engine is available to process messages in the static engine. The static engine suggests a set of next words for a phrase being composed by traversing a phrase through a prefix trie. A phrase exactly matching one contained in the prefix trie is validated and posted. Should the message fail to navigate the prefix trie by having words not contained therein, the static search engine sends the message to the dynamic search engine described in FIG. 10 for validation.

In step 910, words are received, one at a time, as they are typed from incoming phrases. In step 920, extra characters and punctuations, of the phrase, are cleaned up. Doing so aids the matching process performed by the static and dynamic engines. For example, repeating characters may be reduced to a maximum of two, such as transforming "cooooool" to "cool". Similarly, repeating punctuation is reduced to a maximum of one character, with the exception of ending exclamation or question marks which are reduced to a maximum of three. For example: "that"''''''s awesome!!!!!!!!!!!!!" becomes "that's awesome!!!" Digraphs, pairs of letters representing a single speech sound, such as "ea" in "meat" or "th" in "path", are normalized and changed to standard letters. As searches are case sensitive, a simple key index is used to reduce characters, fix punctuation, and remove mixed case for a phrase. For example: "Dont" becomes "Don't" and "GraPHIC" becomes "graphic".

In step 930, words in a message are parsed. For instance, "She said you are pretty" is parsed into the first word="she", the second word "said", the third word "you", the forth word "are", and the fifth word="pretty". Each word and the order, or location of the word in the message, is maintained for sequential treatment.

In step 935 a block check is performed on the phrase. Each word is checked as a root node in the block check trie. Locating a root node causes the traversal of the trie to continue for the next word. Should traversal complete a branch, regardless if there are more words in the phrase or not, the phrase fails the block check. FIG. 11 discusses the block check process. In step 940, a determination is made as to whether the phrase passed or failed the block check. In step 941, a phrase which fails the block check is sent to the bad word check discussed as part of the dynamic engine in FIG. 10.

In step 945, the words are navigated through the prefix trie, one word at a time, in the order of the message, to determine whether a complete path through the prefix tree exactly matching the massage, is present in the prefix trie. For example, the static engine starts at a root node 505 (of the prefix trie shown in FIG. 5) and attempts to match the first word of the chat message. From the root node 505, the static engine looks at each leaf node for one in which the value is "she". Upon locating the leaf node with a value of "she" 615, the rest of the words contained in the phrase must be present as values of child nodes for the phrase to be valid. Therefore the leaf node with a value of "she" 615 contains the set of all pre-approved phrases that has "she" as the first word.

In step 950, the message is checked for optionals at the front or end of the phrase. If an optional is at the end of a phrase, in step 980 the search engine stops the prefix trie traversal and checks that the last word matches the node on the prefix trie. However, if the optional is at the front of a message, or if one does not exist, then the traversal of the message in the prefix tree continues.

Continuing the example, in step 960 a soft match for is made for the last word. A soft match may be predicated on popularity, or ranking, of commonly used phrases. As the search is performed near real-time, during an as-you-type search, the static search engine may use the next letter typed by the user to narrow the scope of the search. For instance, is the most popular phrase is "she is cool", the search engine may suggest is as the next word. However, upon the user typing in "sa" the static engine may narrow the results to those node containing values with "sa" as the first two letters. Therefore the static search engine may suggest in step 970 the node with the value of "said" 625 to the user. As long as the user chooses a word available as a child node, the navigation of the prefix trie continues. If a user types a word unavailable as a next node in the prefix trie, a soft match for a last word cannot longer be made. Therefore, in step 960, the failure to find a soft match directs the static engine to send the message for validation in the dynamic engine in step 965.

At each step of the way a next node is suggested until end of a branch of the prefix tree is reach. If the user reaches the end of a phrase present in the prefix tree, for instance the node with the value of "pretty" 165, step 950 directs the method to step 980 where a match is made for acceptable last words in the prefix trie. This is a validation step to insure nothing extra was inserted into the message. If the user had submitted the message as provided in the prefix trie, the message is provided an "ID" and cleared for posting in step 990. A last word exact match may or may not be a last node in the prefix tree. Going back to the discussion of FIG. 4, recall ending a phrase requires a flag. In that example we showed the sub-phrase "lets meet up" may be an acceptable phrase along with the phrase "lets meet up later". A flag was set at both the node containing the value "up" and the node containing the value "later" to indicate a possible last word.

However, if a determination was made in step 980 that additional content was added to the message, above and beyond that content provided in the prefix trie, the phrase is sent to the dynamic engine in step 965 to be checked. For instance, although the phrase "she said you are pretty" is acceptable, the phrase "she said you are pretty tall" is not. That is because there are no additional nodes beyond pretty with a value of "tall". Therefore in step 965, "she said you are pretty tall" would be sent to the dynamic engine for validation. Only those messages loaded into the prefix trie are validated by the static engine, in step 965, all other messages are sent to the dynamic engine for validation.

Figure 10:
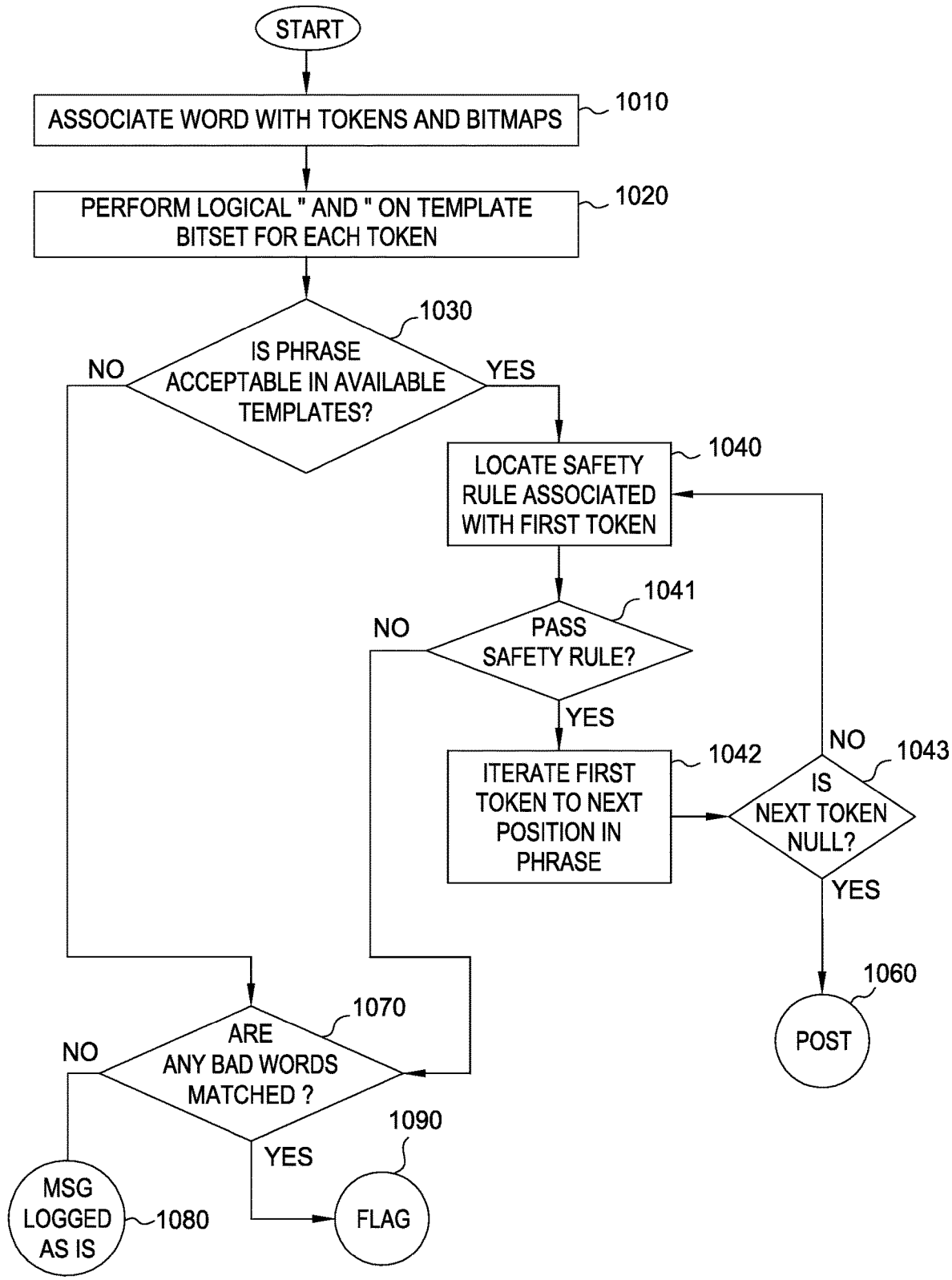
FIG. 10 illustrates a method for the dynamic engine in the Phrase Search Engine, according to one embodiment.
Figure 11:
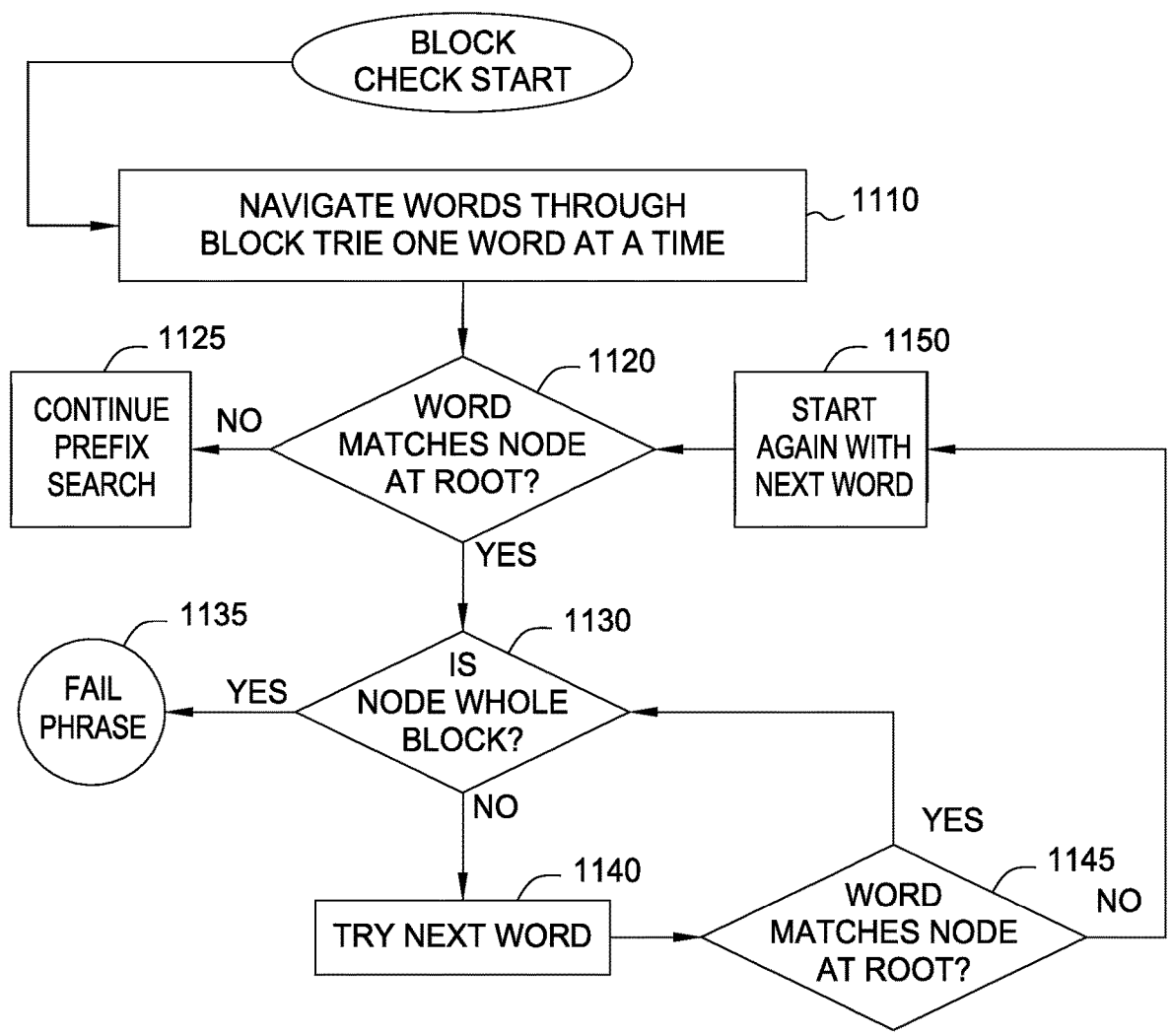
FIG. 11 illustrates a method for identifying an unacceptable block of words, according to one embodiment.

FIG. 10 illustrates a method for the dynamic engine in the Phrase Search Engine, according to one embodiment of the invention. The dynamic engine uses a variety of methods to validate messages based on a plurality of templates and rules.

In step 1010, the dynamic engine divides a chat message into individual words and associates each word with a token. Tokens may represent a single word or a short phrase. For instance, a single token may be used to represent the combination of words "fire truck". A phrase, such as "I saw that", is decomposed by the dynamic engine to generate three tokens. The first token is the word "I". The second token is "saw". And the third and final token for the phrase is the word "that". The tokens are annotated with the grammatical and semantic information for later insertion into the templates and safety rules.

Additionally, bitmaps are associated with each word. The bitmaps were created and exist in an array. Depending on the word position in a phrase a different template bitmap is provided. For example, if the word "I", "saw" and that" each had token bitmaps:

```
I:[i-bitmap_1, i-bitmap_2, i-bitmap_3 ... i-bitmap_7]
SAW:[saw-bitmap_1, saw-bitmap_2, saw-bitmap_3 ... saw-bitmap_7]
THAT:[that-bitmap_1, that-bitmap_2, that-bitmap_3 ... that-bitmap_7]
```

The dynamic engine would use the template bitmaps: i-bitmap_1; saw-bitmap_2; and that-bitmap_3. This occurs since "I" is in the first position, "saw" is in the second position and "that" is in the third position in the phrase "I saw that".

The dynamic engine may have received a partial build of the phrase, or incomplete message, from the static engine. This may be due to the user input deviating from the approved messages stored in the prefix trie. Therefore the dynamic search engine continues to build a phrase and add bitmaps to the logical && until the user finishes a phrase or a $7^{th}$ word is reached. Recall, upon reaching a $7^{th}$ word, the underlying meaning of a phrase can be determined by the safety schema.

In step 1020 a logical AND && is preformed on the template bitmaps. This operation was explained in FIG. 6. The template bitmap list all the known templates in a particular order. In one embodiment, the order of the templates within the bitmap is the same for each word only with different bits turned on or off.

For example, supposed a very simple template bitmap of four templates which may look something like this:

bitmap_X:[template-1, template-2, template-3, template-4]

If the word "Pizza" in the first position only satisfies template-1 and template-3 then:

PIZZA-bimap_1:[1,0,1,0].

If the word "tastes" in the second position satisfies template-1 and template-4 then:

TASTES-bitmap_2:[1,0,0,1].

If the word "great" in the third position only satisfies template-1 and template-3 then:

GREAT-bitmap_3:[1,0,1,0].

Performing a logical && on the phrase "Pizza tastes great" yields the following result:

[1,0,1,0].&& [1,0,0,1].&& [1,0,1,0].=RESULTS:[1,0,0,0].

Therefore only template-1 would apply to the phrase "Pizza tastes great". The rest of the templates have their bits flipped off by the logical && operation. In one embodiment, the template bitmap contains 80,000 templates.

The use of template bitmaps provides very quick analysis for the applicability of potentially 560,000 templates in a 7 word phrase. That is for each of the 7 words there are 80,000 templates. With a logical AND operation, the analysis can be stopped once the operation sums to zero. That is, once a template is not applicable for one word in a particular position; no template will allow the entire phrase with that word in that position. This may happen after a logical && operation of only the first two words. For example "pizza" and "donut" are annotated with "noun_food" while "eat", "eating", "munch" and other consumption and cooking verbs are annotated as "verb_eat". A phrase template such as "verb_eat, noun_food" would permit a phrase like "eats pizza".

The semantic component of the safety schema involves safe annotations placed on words as well as a set of rules that dictate which safe annotations are allowed/prohibited from combining with each other. For example, while "swallows entire pizza" is ok, "swallows huge banana" is inappropriate in online chat. To permit "swallows"+"pizza" while blocking "swallows"+"banana", the safety schema includes safe annotations on words that indicate whether a word can be used as a metaphor for: sexual, violent, bullying, hacking, substance abuse, or Personally Identifying Information (PII) content, to name a few. In the above example "banana" is a sexual noun and "swallow" is a sexual verb. The two words ("swallows"+"banana") cannot combine together due to a safety rule that prohibits combining two sexually connoting words. In contrast, "pizza" does not have a sexual connotation and therefore can combine with "swallow".

The Phrase Search Engine may determine whether a user has completed typing a word (or other portion of a chat message) or selected to augment a current phrase with a suggested word (or phrase) derived from the combinability rules. After the logical && operation a set of templates are left which qualify a phrase. In step 1040, an acceptable phrase is used to locate associated safety templates. Again, annotations for the words may be used in the category safety schema. Alternately, literal safety rules may be tested using the words from the phrase and shown in FIG. 7. A first word in a phrase is used to determine the safety rules which will test the remaining words in subsequent sets in the safety rule. In step 1041, the flow of phrases flow is determined based on the validation of the phrases in the safety rule. For instance, assuming a buffer distance of "0", a safety rule associated with a first word which does not include a second word in set 2 passes the safety rule. In step 1042 phrases which passed the safety rule are checked against the safety rules associated with the next word in the phrase. For example, a phrase "I love big donuts" may pass the safety rule associated with "I" in set 1. Therefore the rule is iterated with the phrase "love big donuts". This checks the safety rules associated with "love" in set 1. This continues until either a safety rules associated with each word is exhausted in step 1043 or the phrase fails by satisfying a safety rule along the way in step 1041.

The safety rules provides schemas which derive possible combinations of good words which may also have an alternatively dubious connotation. In step 1043, a message passing the safety rules is determined to be safe for posting in step 1060. The client is sent an "ID" for the message which may be retrieved.

In step 1030, the phrase was not matched in the template. Additionally, phrases were matched to a template but failed the safety rules in step 1041. In step 1070, such phrases have the words comprising the phrase checked against the loaded corpus of bad words. A bad word match looks at a list of unacceptable words and any words found in the list causes the message to be flagged in step 1090. However, if the message contained no bad words, step 1080 logs the message as is.

FIG. 11 illustrates a method for performing a check for an unacceptable block of words, by the static engine, according to one embodiment. Again, in this context, a block is a combination of words deemed unacceptable. In step 1110, words from a phrase traverse the block trie, one word at a time. Like the safety rules, each word in the search phrase is checked one at a time to see if it starts a "block." However, unlike safety rules, the graph is a trie and it matches on words in the original search phrase instead of tokens after matching a dynamic phrase. That is, each word is checked as a root node. Therefore each word of the phrase is independently checked through the block check.

In step 1120, a word is checked against the root nodes for a match. In step 1125, a failure to match a root node in the block check causes the phrase to be searched in the prefix trie in the static engine for an acceptable phrase. Therefore an unacceptable block beginning with the word is not present. In step 1130, a root node is checked for children. Such a node without children indicated the single node is the entire block. For example, a phrase "go f#$! Yourself" might pass the block check on traverse of the first word "go". However, upon encountering the word "f#$!" a root node is found. However, there may be no child nodes. This is because the word "f#$!" is unacceptable no matter what follows. In step 1136, the phrase fails the block check.

In step 1140, the next word is checked in the trie traversal. In step 1145, the next word is determined to be a child node of the root. In step 1130, a child node checks to see if it completes a block. For example, a single block "doing that", will prevent any phrase containing this particular sequence of words. If "stop doing that silly," the block check starts with "stop", finds nothing, then starts with "doing" and that leads it to find "doing that" (because like the static trie, "doing" is a root node, and "that" is a child of "doing") at which point, in step 1135, the phrase is blocked.

However, in step 1150, a next word failing to match a child node starts the block check in step 1120 with the next word. Going back to the previous example, "stop doing that silly," the root node stop was determined in step 1145 to not have a child node "doing". In step 1150, a next word is selected as the potential beginning of a block. In step 1120 a root node is searched that may match the next word determined in step 1150. Here, the block check starts with a new search for a root node "doing".

In one embodiment a search phrase is received and parsed into words ("i aaaate ewe . . . . !!!" becomes [i,aaaate,ewe]). A static check would not identify this as an acceptable chat message, so the words of this message are evaluated by the dynamic engine. The dynamic check may match the chat message "I ate ewe" to a template, such as ([personal_pronoun], [verb], [animal_noun]).

Before sending this message, however, it is evaluated against the safety rules. First, terms in the chat message are converted into references to tokens ([i,aaaate,ewe] becomes [i,ate,ewe]). During the safety check the terms are successively compared to categories (groups of words) in the rule. The search starts with token referred by "I", which has a reference to this safety rule: [[I, eye, aye], [hate, eight, ate], [you, ewe, woo]]. The processing starts with the second token "ate". The second token "ate" is present in the second category set, i.e., in the group [hate, eight, ate], so processing continues with the next word "ewe". The third token "ewe" is present in the third category set, i.e., in the group [you, ewe, woo]. The search phrase "i aaaate ewe . . . . !!!" satisfies the rule and is, therefore, blocked from being sent to a recipient.

Advantageously, embodiments of the invention provide a variety of techniques for supplying users in an online environment with a safe and effective chat facility. The Phrase Search Engine is configured with a static and a dynamic engine to quickly (real-time) identify and filter safe messages for a user in the online environment. For example, in one embodiment, real-time search and validation of phrases are preformed using linguistic phrase components. The allowability of a given phrase (or suggested phrase) is determined as a user types a phrase (or requests to send a phrase).

While the foregoing is directed to embodiments of the present invention, other and further embodiments of the invention may be devised without departing from the basic scope thereof, and the scope thereof is determined by the claims that follow.

What is claimed is:

1. A computer-implemented method for evaluating a chat message sent between users of an online environment, comprising:
   traversing a prefix trie based on the chat message, wherein each node within the prefix trie corresponds to a respective term, and wherein traversing the prefix trie further comprises:
   matching a first term in the chat message to a root node of the prefix trie; and
   matching one or more successive terms in the chat message, to a child node of a node corresponding to a preceding term in the chat message; and
   upon determining the chat message does not correspond to at least one traversable path in the prefix trie, based on a first node within the prefix trie not having a child node corresponding to a next term within the chat message:
   identifying a plurality of binary bitmaps corresponding to the chat message and relating to a plurality of templates;
   identifying at least one template of the plurality of templates based on the plurality of binary bitmaps, wherein each template specifies a pattern for an allowed chat message based on metadata specifying word type and word usage; and
   determining the chat message is valid based on the identified at least one template, and in response transmitting the chat message to a message recipient.

2. The method of claim 1, wherein an equivalence node links two nodes in the traversable path, and wherein the equivalence node provides an optional path between the two nodes for traversing the prefix trie.

3. The method of claim 1, wherein the plurality of binary bitmaps includes a binary bitmap for each term in the chat message, wherein bits set to one correspond to templates which include the pattern for the term in the chat message and bits set to zero correspond to templates which do not include the pattern for the term in the chat message, wherein identifying the one or more templates comprises performing a logical AND operation on the identified binary bitmaps to obtain a resultant bitmap, and wherein determining the chat message is valid comprises determining at least one bit in the resultant bitmap is set to one.

4. The method of claim 1, wherein traversing the prefix trie comprises:
   matching a first term in the chat message to a root node in the prefix trie; and
   matching the successive term in the chat message to a child node of the root node.

5. The method of claim 4, further comprising:
   traversing the prefix trie while a sender composes the chat message, term-by term; and
   presenting, for a current node of the prefix trie, terms associated with one or more linked nodes of the current node as suggestions for a next term in the chat message.

6. The method of claim 1, wherein the metadata further includes links to a rule, describing prohibited combinations of terms in the chat message.

7. The method of claim 6, further comprising:
   identifying the rule based on a first term of the chat message, wherein the first term is in a first set of terms associated with the rule;
   determining whether a second term in the chat message is present in a second set of terms in the rule; and
   upon determining the second term is not present in the second set of terms in the rule, locating a second rule based on the second term of the chat message wherein the second term is present in a first set of terms of the second rule.

8. The method of claim 7, further comprising:
upon determining a third term in the chat message is not present in a second set of terms of the second rule, determining the chat message is valid.

9. The method of claim 1, further comprising:
upon matching each term in the chat message to nodes in the prefix trie, thereby identifying a traversable path in the prefix trie corresponding to the chat message, transmitting the chat message to a message recipient.

10. A non-transitory computer-readable storage medium storing a program, which, when executed by a processor performs an operation for evaluating a chat message sent between users of an online environment, the operation comprising:
traversing a prefix trie based on the chat message, wherein each node within the prefix trie corresponds to a respective term, and wherein traversing the prefix trie further comprises:
matching a first term in the chat message to a root node of the prefix trie; and
matching one or more successive terms in the chat message, to a child node of a node corresponding to a preceding term in the chat message; and
upon determining the chat message does not correspond to at least one traversable path in the prefix trie, based on a first node within the prefix trie not having a child node corresponding to a next term within the chat message:
identifying a plurality of binary bitmaps corresponding to the chat message and relating to a plurality of templates;
identifying at least one template of the plurality of templates based on the plurality of binary bitmaps, wherein each template specifies a pattern for an allowed chat message based on metadata specifying word type and word usage; and
determining the chat message is valid based on the identified at least one template, and in response transmitting the chat message to a message recipient.

11. The computer-readable storage medium of claim 10, wherein an equivalence node links two nodes in the traversable path, and wherein the equivalence node provides an optional path between the two nodes.

12. The computer-readable storage medium of claim 10, wherein the plurality of binary bitmaps includes a binary bitmap for each term in the chat message, wherein bits set to one correspond to templates which include the pattern for the term in the chat message and bits set to zero correspond to templates which do not include the pattern for the term in the chat message, wherein identifying the one or more templates comprises performing a logical AND operation on the identified binary bitmaps to obtain a resultant bitmap, and wherein determining the chat message is valid comprises determining at least one bit in the resultant bitmap is set to one.

13. The computer-readable storage medium of claim 10, wherein traversing the prefix trie, comprises:
matching a first term in the chat message to a root node in the prefix trie; and
matching the successive term in the chat message to a child node of the root node.

14. The computer-readable storage medium of claim 13, wherein traversing the prefix trie further comprises:
traversing the prefix trie while a sender composes the chat message, term-by term; and
presenting, for a current node of the prefix trie, terms associated with one or more linked nodes of the current node as suggestions for a next term in the chat message.

15. The computer-readable storage medium of claim 10, wherein the metadata further includes links to a rule, describing prohibited combinations of terms in the chat message.

16. The computer-readable storage medium of claim 15, the operation further comprising:
identifying the rule based on a first term of the chat message, wherein the first term is in a first set of terms associated with the rule;
determining whether a second term in the chat message is present in a second set of terms in the rule; and
upon determining the second term is not present in the second set of terms in the rule, locating a second rule based on the second term of the chat message wherein the second term is present in a first set of terms of the second rule.

17. The computer-readable storage medium of claim 16, the operation further comprising:
upon determining a third term in the chat message is not present in a second set of terms of the second rule, determining the chat message is valid.

18. A system, comprising:
a processor; and
a memory, wherein the memory includes an application program configured to perform an operation for evaluating a chat message sent between users of an online environment, comprising:
traversing a prefix trie based on the chat message, wherein each node within the prefix trie corresponds to a respective term, and wherein traversing the prefix trie further comprises:
matching a first term in the chat message to a root node of the prefix trie; and
matching one or more successive terms in the chat message, to a child node of a node corresponding to a preceding term in the chat message; and
upon determining the chat message does not correspond to at least one traversable path in the prefix trie, based on a first node within the prefix trie not having a child node corresponding to a next term within the chat message:
identifying a plurality of binary bitmaps corresponding to the chat message and relating to a plurality of templates;
identifying at least one template of the plurality of templates based on the plurality of binary bitmaps, wherein each template specifies a pattern for an allowed chat message based on metadata specifying word type and word usage; and
determining the chat message is valid based on the identified at least one template, and in response transmitting the chat message to a message recipient.

19. The system of claim 18, wherein an equivalence node links two nodes in the traversable path, and wherein the equivalence node provides an optional path between the two nodes.

20. The system of claim 18, wherein the plurality of binary bitmaps includes a binary bitmap for each term in the chat message, wherein bits set to one correspond to templates which include the pattern for the term in the chat message and bits set to zero correspond to templates which do not include the pattern for the term in the chat message, wherein identifying the one or more templates comprises performing a logical AND operation on the identified binary bitmaps to obtain a resultant bitmap, and wherein determining the chat message is valid comprises determining at least one bit in the resultant bitmap is set to one.

21. The system of claim 18, wherein traversing the prefix trie, comprises:
   matching a first term in the chat message to a root node in the prefix trie; and
   matching the successive term in the chat message to a child node of the root node.

22. The system of claim 21, wherein traversing the prefix trie further comprises:
   traversing the prefix trie while a sender composes the chat message, term-by term; and
   presenting, for a current node of the prefix trie, terms associated with one or more linked nodes of the current node as suggestions for a next term in the chat message.

23. The system of claim 18, wherein the metadata further includes links to a rule, describing prohibited combinations of terms in the chat message.

24. The system of claim 23, the operation further comprising:
   identifying the rule based on a first term of the chat message, wherein the first term is in a first set of terms associated with the rule;
   determining whether a second term in the chat message is present in a second set of terms in the rule;
   upon determining the second term is not present in the second set of terms in the rule, locating a second rule based on the second term of the chat message wherein the second term is present in a first set of terms of the second rule; and
   upon determining a third term in the chat message is not present in a second set of terms of the second rule, determining the chat message is valid.

* * * * *